United States Patent
Ikeno et al.

(10) Patent No.: US 9,763,383 B2
(45) Date of Patent: Sep. 19, 2017

(54) BLADE MOUNTING STRUCTURE OF LAWN MOWER

(71) Applicant: HONDA MOTOR CO., LTD., Tokyo (JP)

(72) Inventors: Tetsuro Ikeno, Wako (JP); Shoji Hasei, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 14/670,625

(22) Filed: Mar. 27, 2015

(65) Prior Publication Data

US 2015/0271996 A1    Oct. 1, 2015

(30) Foreign Application Priority Data

Mar. 27, 2014  (JP) .................................. 2014-065977

(51) Int. Cl.
*A01D 34/73* (2006.01)
*A01D 34/82* (2006.01)

(52) U.S. Cl.
CPC .......... *A01D 34/733* (2013.01); *A01D 34/828* (2013.01)

(58) Field of Classification Search
CPC .... A01D 34/733; A01D 34/828; A01D 34/76; A01D 34/6812; A01D 34/905; A01D 75/18; A01D 75/182; A01D 2101/00; F16D 7/02; F16D 7/024; F16D 7/028;
(Continued)

(56) References Cited

U.S. PATENT DOCUMENTS 2,891,642 A * 6/1959 Moore ................... F16D 67/02
                                                        192/18 R
3,026,665 A * 3/1962 Hoff .................. A01D 34/6812
                                                         188/77 R
(Continued)

FOREIGN PATENT DOCUMENTS

JP         1-068727         5/1989
JP         03-157520        7/1991
(Continued)

OTHER PUBLICATIONS

Japanese Notice of Allowance dated Jun. 13, 2017, English translation included, 6 pages.

Primary Examiner — Thomas B Will
Assistant Examiner — Joan D Misa
(74) Attorney, Agent, or Firm — Rankin, Hill & Clark LLP

(57) ABSTRACT

A blade mounting structure of a lawn mower includes: a drive hub mounted on an output shaft of a power source and protruding radially outward beyond an outer periphery of the output shaft; a friction member for transmitting driving force from the drive hub to a blade holder, the drive hub and the friction member having respective curved surfaces slidable on each other when the drive hub and the friction member are in abutting engagement with each other; a grass cutting blade attached to the blade holder; and an energy absorbing member disposed in a space defined by the blade holder and members peripheral to the blade holder, the energy absorbing member being constructed to maintain its shape during normal grass cutting condition but deform when a load exceeding a predetermined value acts on the energy absorbing member.

5 Claims, 17 Drawing Sheets

(58) Field of Classification Search
CPC .... F16D 43/213; F16D 43/218; F16F 15/124; Y10T 83/8719; Y10T 83/9379
USPC .............. 56/10.3, 10.4, 11.3, 11.8, 12.7; 464/42–44, 89
See application file for complete search history.

(56) References Cited

U.S. PATENT DOCUMENTS

| | | | | |
|---|---|---|---|---|
| 3,116,649 | A * | 1/1964 | Wickman | F16H 61/0262 192/18 R |
| 3,253,391 | A * | 5/1966 | Meldahl | A01D 34/6812 192/12 R |
| 3,802,170 | A * | 4/1974 | Seifert | A01D 34/63 56/11.8 |
| 3,994,376 | A * | 11/1976 | Fulghum | F16D 67/00 188/82.9 |
| 4,035,994 | A * | 7/1977 | Hoff | A01D 34/6812 188/166 |
| 4,041,679 | A * | 8/1977 | Seifert | A01D 34/63 56/11.3 |
| 4,226,313 | A * | 10/1980 | Meldahl | A01D 34/6812 192/18 R |
| 4,320,822 | A * | 3/1982 | Meldahl | A01D 34/6812 192/105 CF |
| 4,351,424 | A * | 9/1982 | Lawrence | A01D 34/6812 192/18 R |
| 4,362,004 | A * | 12/1982 | Rush, Jr. | A01D 34/6812 192/18 R |
| 4,369,616 | A * | 1/1983 | Cody | A01D 34/6812 192/18 R |
| 4,372,433 | A * | 2/1983 | Mitchell | A01D 34/6812 192/18 R |
| 4,433,764 | A * | 2/1984 | Goscenski, Jr. | F16D 67/02 192/18 R |
| 4,466,233 | A * | 8/1984 | Thesman | A01D 34/6812 192/14 |
| 4,513,848 | A * | 4/1985 | Lo | A01D 34/6812 192/103 B |
| RE32,202 | E * | 7/1986 | Cody | A01D 34/6812 192/18 R |
| 5,407,400 | A * | 4/1995 | Thomas | A01D 34/6812 477/21 |
| 6,464,055 | B1 * | 10/2002 | Wians | A01D 34/6812 192/14 |
| 6,615,964 | B2 * | 9/2003 | Osborne | A01D 34/6812 192/107 M |
| 7,337,598 | B2 * | 3/2008 | Plouraboue | A01D 34/6812 56/11.7 |

FOREIGN PATENT DOCUMENTS

| | | |
|---|---|---|
| JP | 6-17839 | 1/1994 |
| JP | 08-163915 | 6/1996 |
| JP | 2001-333617 | 12/2001 |

* cited by examiner

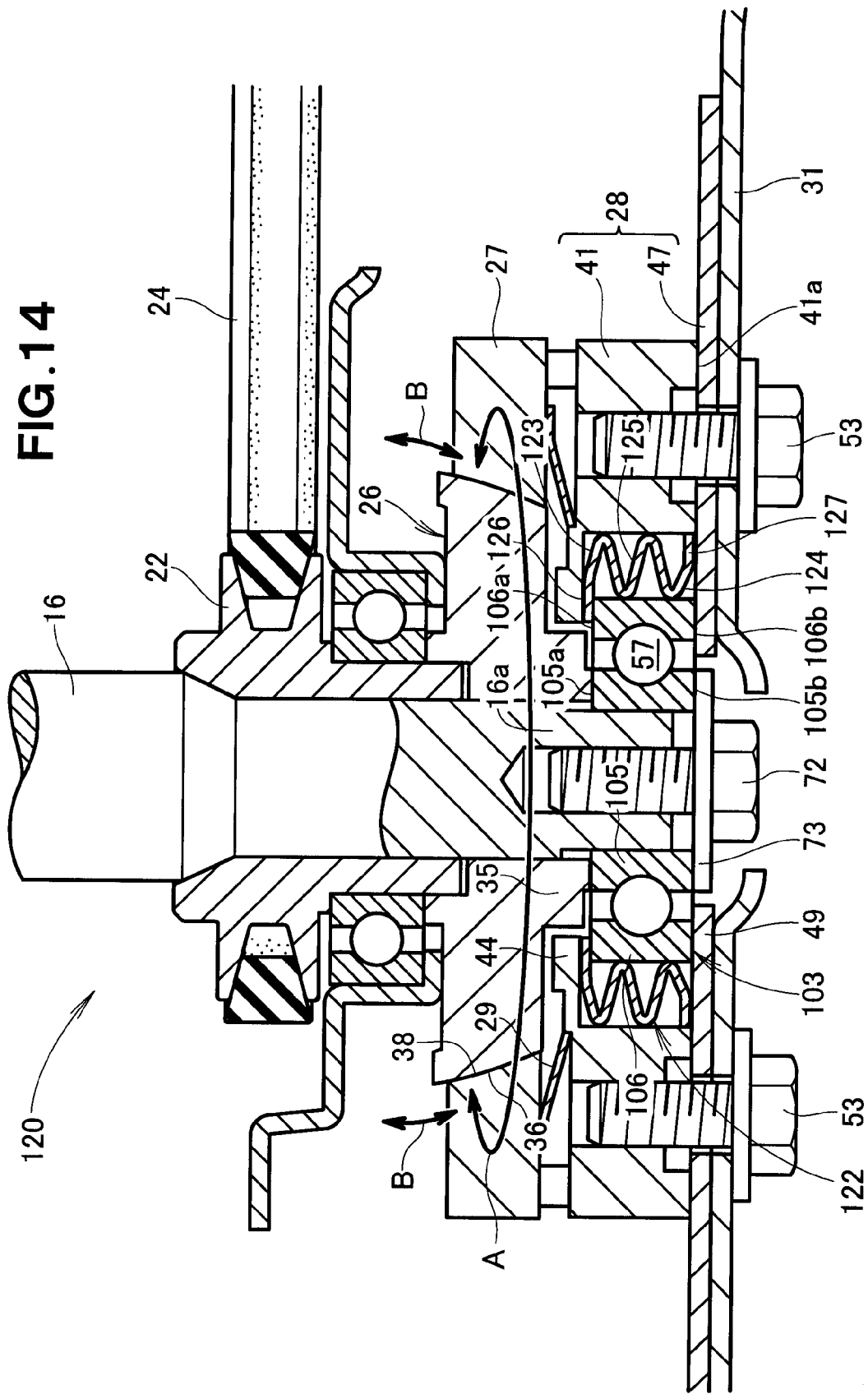

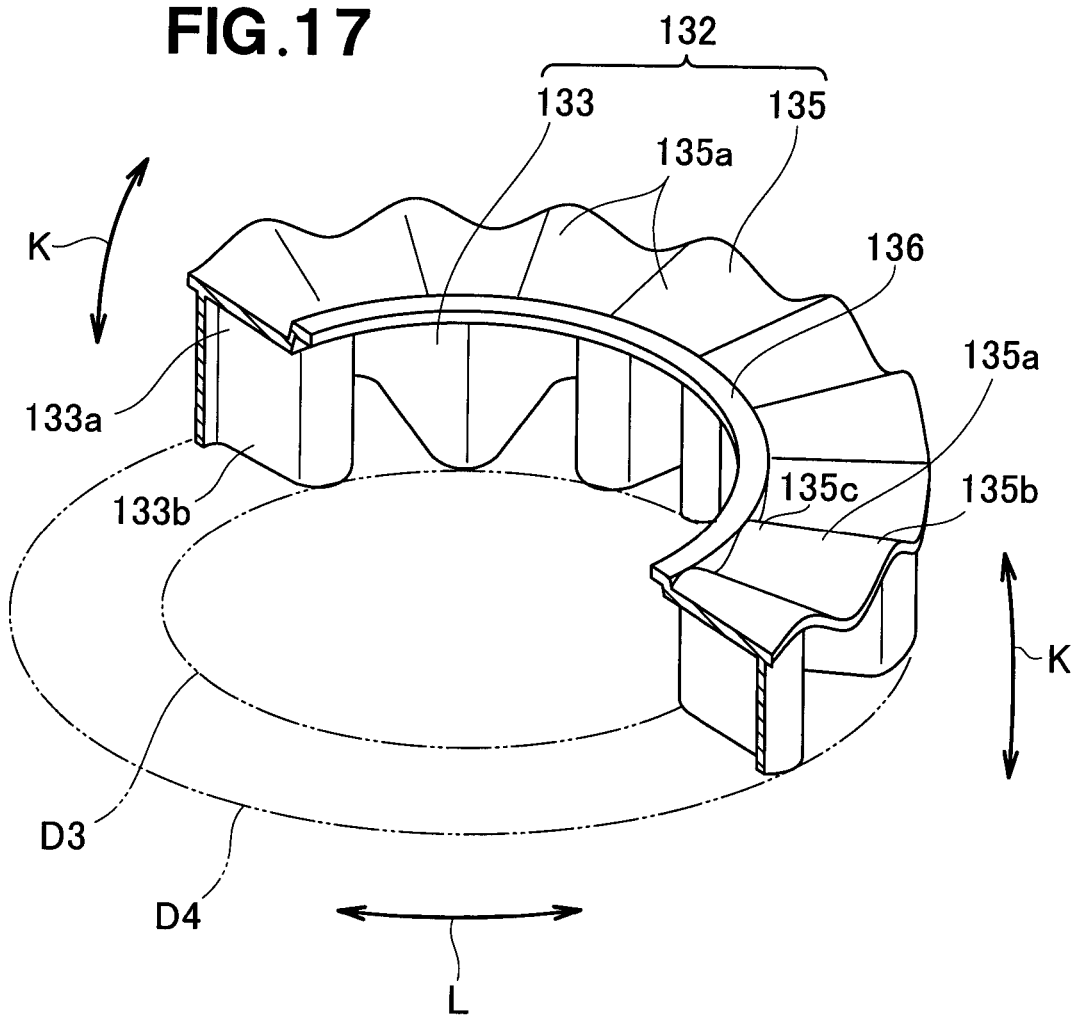

BLADE MOUNTING STRUCTURE OF LAWN MOWER

FIELD OF THE INVENTION

The present invention relates to a blade mounting structure of a lawn mower where a grass cutting blade is mounted on an output shaft of a power source via a blade holder.

BACKGROUND OF THE INVENTION

Among the conventionally-known lawn mowers is one disclosed in Japanese Patent Application Laid-open Publication H-06-17839 (hereinafter referred to as "the relevant patent literature"), where an output shaft extends downwardly of a power source and a grass cutting blade is mounted on the output shaft via a drive hub, a friction member, etc. More specifically, in the lawn mower disclosed in the relevant patent literature, the drive hub is provided on the output shaft extends downward from the power source, the friction member has a frictional surface adapted to be pressed against a frictional surface of the drive hub, and a blade holder is connected to the friction member. Further, the frictional surface of the drive hub is formed in a convex truncated cone shape, while the frictional surface of the friction member is formed in a concave truncated cone shape.

By the friction member being pressed via a coned disk spring, the frictional surface of the friction member is brought into contact with the frictional surface of the drive hub, so that driving force of the power source is transmitted to the grass cutting blade via the output shaft, the drive hub, the friction member and the blade holder. Thus, the grass cutting blade can be rotated to cut grass.

If the grass cutting blade hits an obstacle, such as a sprinkler or stone, during grass cutting operation, the frictional surface of the friction member can slide relative to the frictional surface of the drive hub and thereby absorb an impact load input to the grass cutting blade. Thus, it is possible to suppress the input impact load from being transmitted to the output shaft and thereby protect the output shaft.

However, in the lawn mower disclosed in the relevant patent literature, where the frictional surface of the drive hub is formed in a convex truncated cone shape while the frictional surface of the friction member is formed in a concave truncated cone shape, the frictional surface of the friction member cannot be slid relative to the frictional surface of the drive hub in a vertical (up-down) direction. Thus, when the grass cutting blade hits an obstacle, such as a sprinkler or stone, so that an impact load that acts on the friction member is input in such a manner as to move the friction member in the vertical direction, a bending load acts on the output shaft.

As a measure to let go the bending load acting on the output shaft, the friction member may be constructed so as to be able to slide relative to the drive hub in the vertical direction. However, if such a measure is employed, it would become difficult to position the friction member and the blade holder, and thus, it would take much time and labor to center the grass cutting blade relative to the output shaft.

SUMMARY OF THE INVENTION

In view of the foregoing prior art problems, it is an object of the present invention to provide an improved blade mounting structure of a lawn mower which can effectively absorb an impact load by permitting movement of the friction member in horizontal and vertical directions but also allows the grass cutting blade to be centered relative to the output shaft with ease.

In order to accomplish the above-mentioned object, the present invention provides an improved blade mounting structure of a lawn mower, which comprises: a drive hub mounted on an output shaft of a power source and protruding radially outward beyond the outer periphery of the output shaft; a friction member disposed around the drive hub and configured to transmit driving force from the drive hub to a blade holder when the friction member is in abutting engagement with the drive hub, the drive hub and the friction member having respective curved surfaces slidable on each other when the drive hub and the friction member are in abutting engagement with each other; a grass cutting blade attached to the blade holder; and an energy absorbing member disposed in a space defined by the blade holder and members peripheral to the blade holder, the energy absorbing member being constructed to maintain its shape during normal operating condition but deform when a load exceeding a predetermined value acts on the energy absorbing member.

In the present invention, the drive hub and the friction member have the respective curved surfaces that are of complementary curved shapes and that are slidable on each other when the drive hub and the friction member are in abutting engagement with each other. Thus, when the drive hub and the friction member are in abutting engagement with each other, the friction member can be rotated relative to the drive hub in a horizontal direction but also moved relative to the drive hub in a vertical (up-down) direction.

Further, in the present invention, the energy absorbing member is disposed in the space defined by the blade holder and the members (in this case, the output shaft and the drive shaft) peripheral to the blade holder, and the energy absorbing member is constructed to deform when a load exceeding a predetermined value acts on the energy absorbing member. Thus, when an impact load has been input which would move the friction member relative to the drive hub in the vertical direction, the present invention can absorb the impact load by deforming the energy absorbing member to cause the friction member to move in the vertical direction. Further, when an impact load has been input which would move the friction member relative to the drive hub in the horizontal direction, the present invention can absorb the impact load by causing the friction member to move relative to the drive in the horizontal direction.

Furthermore, in the present invention, the energy absorbing member, disposed in the space defined by the blade holder and the members peripheral to the blade holder, is constructed to maintain its shape against deformation during the normal operating condition. Thus, the present invention can position the blade holder at an accurate position relative to the peripheral member by means of the energy absorbing member. Further, by the shape of the energy absorbing member being maintained against deformation, the present invention can position the blade holder (grass cutting blade) at the accurate position and thereby readily center the grass cutting blade relative to the output shaft.

Preferably, the space is defined in an annular shape, about the output shaft, with the blade holder, the drive hub and the output shaft, and the energy absorbing member has an annular shape and disposed in the annular space. By being formed in the annular shape in accordance with the annular shape of the space, the energy absorbing member can be readily assembled into the space. Further, by being disposed in the annular space, the energy absorbing member can be positioned around the output shaft. Thus, when an impact load has been input from a certain position along the periphery of the output shaft, the energy absorbing member can be deformed suitably by the input impact load. In this way, the impact load input from the certain position along the periphery of the output shaft can be absorbed suitably by the friction member being moved vertically relative to the drive hub.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 14 is a sectional view of a fifth embodiment of the blade mounting structure of the present invention;

FIG. 17 is a perspective view of an energy absorbing member shown in FIG. 16.

DETAILED DESCRIPTION OF THE INVENTION

Now, a description will be given about and preferred embodiments of a blade mounting structure of a lawn mower in relation to a case where the lawn mower is constructed as a walk-behind lawn mower 10.

Figure 1:
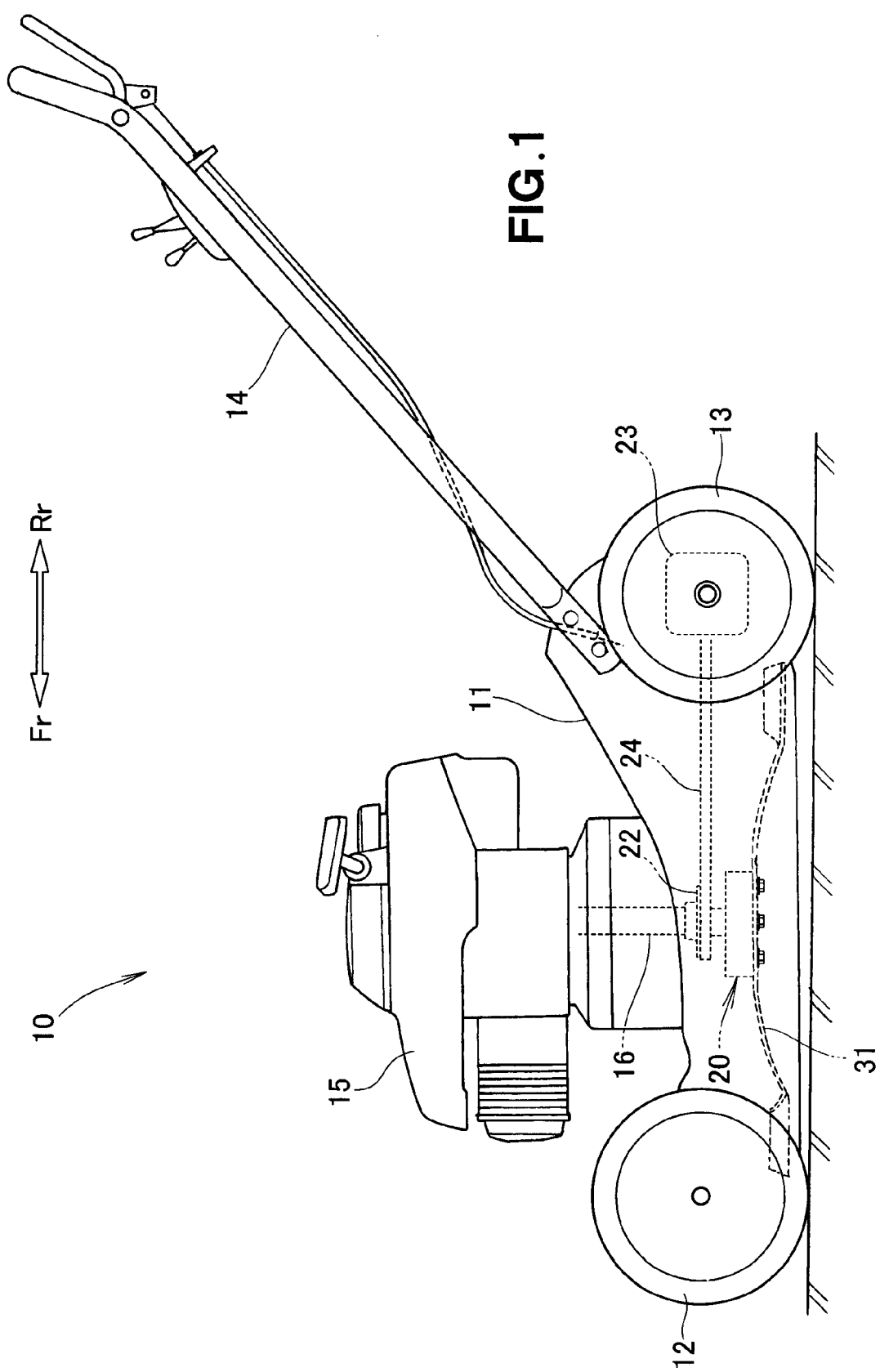
FIG. 1 is a side view of a walk-behind lawn mower equipped with a first embodiment of a blade mounting structure of the present invention.

FIG. 1 is a side view of the walk-behind lawn mower 10 equipped with a first embodiment of the blade mounting structure 20. As shown in FIG. 1, a first embodiment of the walk-behind lawn mower 10 includes: a downwardly-opening housing 11; front and rear wheels 12 and 13 provided on the housing 11; an operating handle 14 provided on a rear portion of the housing 11; an engine (power source) 15 provided over the housing 11; an output shaft 16 extending downward from the engine 15; and the blade mounting structure 20 mounted on the output shaft 16.

In the walk-behind lawn mower 10, a pulley 22 is press-fitted on the output shaft 16 and connected to the output shaft 16 by a key (not shown), and a drive belt 24 is mounted or wound on the pulley 22 and a reduction gear mechanism 23. Thus, as the engine 15 is driven, rotation of the output shaft 16 is transmitted to the reduction gear mechanism 23 via the pulley 22 and the drive belt 24. Then, by the rear wheel 13 being rotated by the reduction gear mechanism 23, the walk-behind lawn mower 10 is self-propelled to travel (i.e., self-travel). Meanwhile, the rotation of the output shaft 16 is transmitted to the blade mounting structure 20, so that a grass cutting blade 31 rotates. In this manner, the walk-behind lawn mower 10 can cut or clip grass by means of the grass cutting blade 31 while self-traveling.

Figure 2:
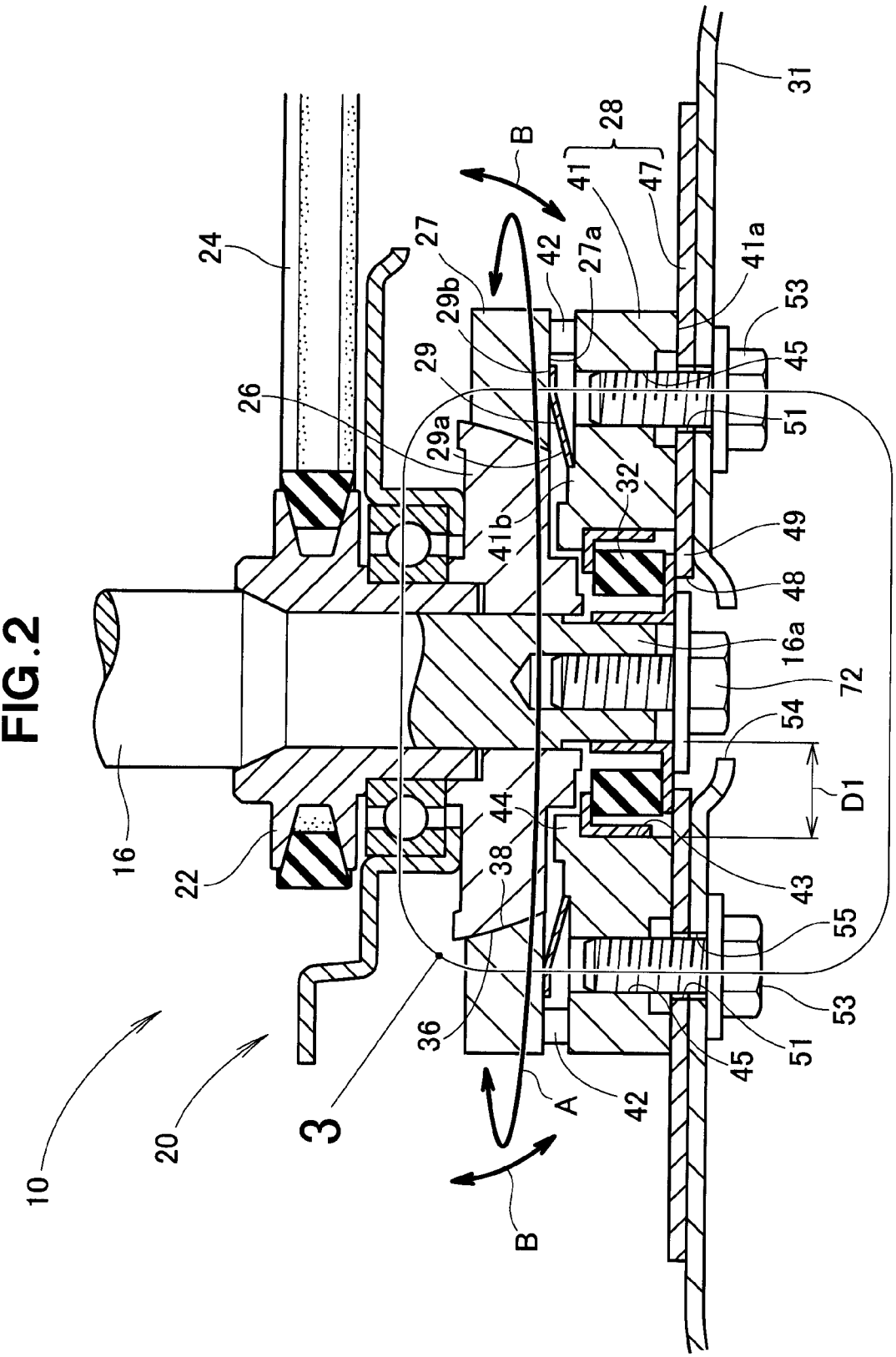
FIG. 2 is a sectional view of the first embodiment of the blade mounting structure of FIG. 1.

As shown in FIG. 2, the first embodiment of the blade mounting structure 20 includes: a drive hub 26 mounted on the output shaft 16; a friction member 27 disposed around the drive hub 26; a blade holder 28 disposed beneath the friction member 27; a coned disk spring 29 disposed between the blade holder 28 and the friction member 27; the grass cutting blade 31 attached to the blade holder 28; and an energy absorbing member 32 disposed between the blade holder 28 and the drive hub 26.

The drive hub 26 is disposed beneath the pulley 22 and press-fitted on the output shaft 16 from below, and the drive hub 26 is connected to the output shaft 16 via a key (not shown). Thus, the rotation of the output shaft 16 is transmitted to the drive hub 26 so that the hub 26 rotates together with the output shaft 16. The drive hub 26 press-fitted on the output shaft 26 protrudes radially outward beyond the output shaft 16, and thus, the drive hub 26 lies in a disk shape around the output shaft 16.

Figure 3:
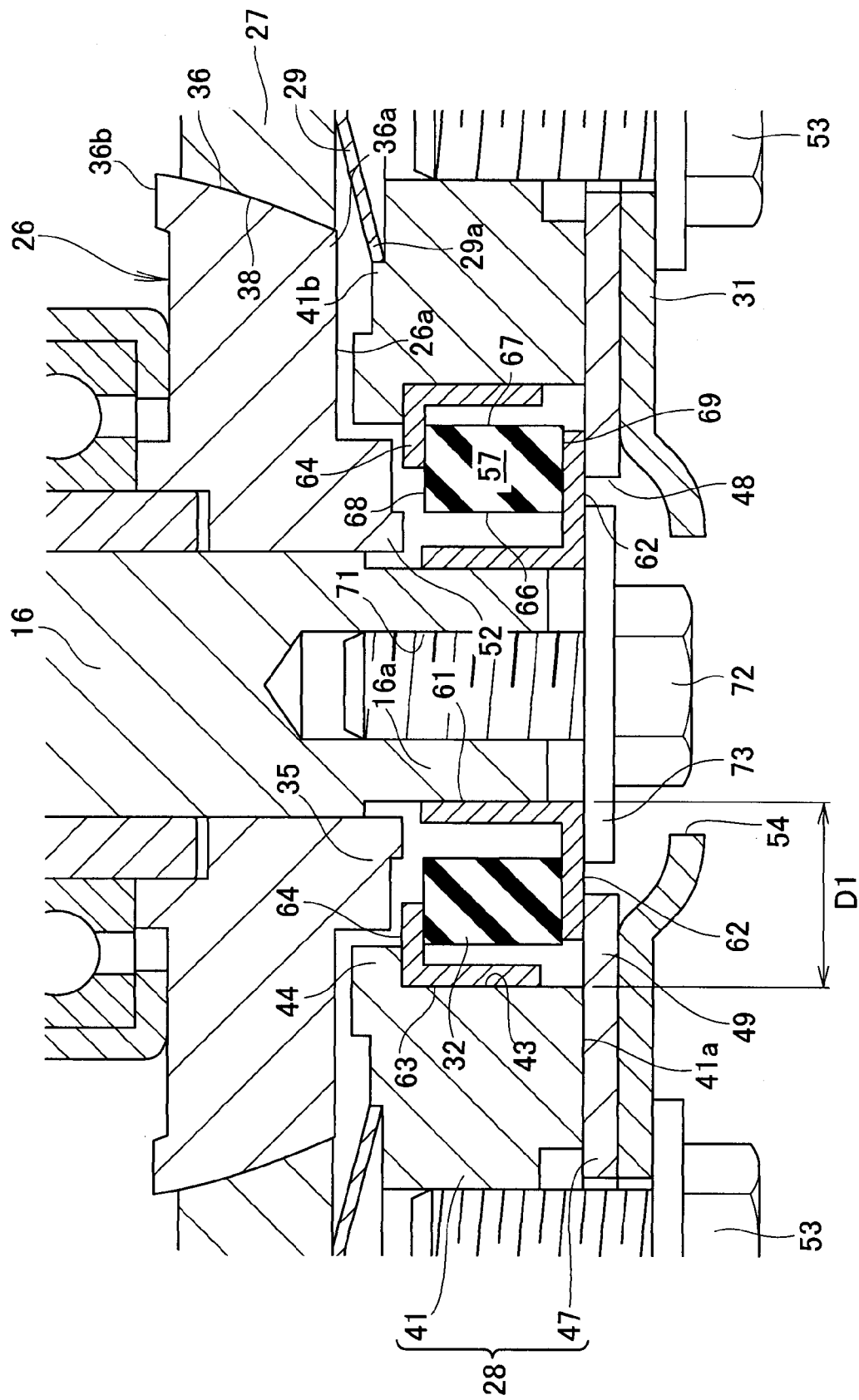
FIG. 3 is an enlarged sectional view of a section surrounded at 3 of FIG. 2.

As shown in FIG. 3, the drive hub 26 has a protruding section (hereinafter "hub's protruding section") 35 protruding downward from the bottom surface 26a, and a curved surface (hub's curved surface) 36 along its outer periphery. The hub's curved surface 36 is a frictional surface defined by a part of a convex spherical surface; more specifically, the hub's curved surface 36 is formed as a convexly arcuately curved surface that gradually gets away from the output shaft 16 in a direction from its lower end 36a to its upper end 36b.

The friction member 27 is disposed around the drive hub 26 (see also FIG. 2) and has a frictional curved surface 38 along its inner periphery. The frictional curved surface 38 is a frictional defined by a part of a concave spherical surface; more specifically, the frictional curved surface 38 is formed as a concave curved surface that is complementary in shape to the hub's curved surface 36 and that confronts and extends along the hub's curved surface 36.

The hub's curved surface 36 of the drive hub 26 and the frictional curved surface 38 of the friction member 27 are formed to be capable of abuttingly engage with (contact) each other over their entire regions. When the hub's curved surface 36 and the frictional curved surface 38 are in abutting engagement with each other (i.e., in a mutually-abutting state), frictional force is produced between the hub's curved surface 36 and the frictional curved surface 38, so that driving force of the drive hub 26 can be transmitted to the friction member 27. In other words, by the frictional force produced between the hub's curved surface 36 and the frictional curved surface 38, the friction member 27 can be rotated together with the drive hub 26.

Referring back to FIG. 2, the frictional curved surface 38 and the hub's curved surface 36 are slidable on each other in given directions in the mutually-abutting state. Thus, in the mutually-abutting state of the frictional curved surface 38 and the hub's curved surface 36, the friction member 27 can be not only rotated relative to the drive hub 26 in a horizontal direction (i.e., direction of arrow A) but also moved relative to the drive hub 26 in a vertical (up-down) direction (i.e., direction of arrow B).

The blade holder 28 is disposed beneath the friction member 27 and fitted over a lower portion 16a of the output shaft 16 with an interval D1 left therebetween. The blade holder 28 includes a holder body 41 connected to the friction member 27, and a holder plate 47 disposed on the lower surface 41a of the holder body 41.

The holder body 41 includes: a connection section 42 connecting to the friction member 27 so that it can rotate together with the friction member 27; a central fitting section 43 provided coaxially with the output shaft 16; a protruding section (holder's protruding section) 44 protruding inward from the upper end of the central fitting section 43; and a plurality of screw holes 45 provided around the central fitting section 43. The central fitting section 43 opens in a circular shape, and the holder's protruding section 44 is formed in a flange shape on the upper end of the fitting section 43.

The holder plate 47 has a central opening 48 formed coaxially with the fitting section 43, an opening peripheral edge portion 49 defining the peripheral edge of the central opening 48, and a plurality of through-holes 51 formed around the opening peripheral edge portion 49.

A coned disk spring 29 is disposed between the blade holder 28 and the friction member 27. The coned disk spring 29, which has an annular shape, has an inner peripheral portion 29a abutted against an upper stepped portion 41b of the holder body 41, and an outer peripheral portion 29b abutted against the underside 27a of the friction member 27. Thus, the friction member 27 is normally urged upward by biasing force of the coned disk spring 29 so that the frictional curved surface 38 is held abutted against the hub's curved surface 36. In this condition, driving force of the engine 15 (FIG. 1) is transmitted to the blade holder 28 via the drive hub 26 and the friction member 27.

Among the conventionally-known lawn mowers are ones equipped with a blade brake clutch mechanism. With such a blade brake clutch mechanism, the above-mentioned frictional curved surface 38 can be spaced downward from the above-mentioned hub's curved surface 36 against the biasing force of the coned disk spring 29. Thus, the rotation of the grass cutting blade 31 can be stopped by the brake while the output shaft 16 is rotating.

The walk-behind lawn mower 10 equipped with the first embodiment of the blade mounting structure 20 of the invention, however, does not include such a blade brake clutch mechanism. Thus, the frictional curved surface 38 is normally held in abutting engagement with the hub's curved surface 36 by the biasing force of the coned disk spring 29. Namely, the grass cutting blade 31 is normally held rotatable together with the output shaft 16.

The grass cutting blade 31 is attached to the blade holder 28 by means of a plurality of bolts 53. The grass cutting blade 31 has a central opening portion (blade's opening portion) 54 formed therethrough coaxially with the opening portion 48 of the holder plate 47, and a plurality of mounting holes 55 formed therethrough around the blade's opening portion 54.

A plurality of bolts 53 are each inserted through a respective one of the mounting holes 55 of the grass cutting blade 31 and a respective one of the through-holes 51 of the holder plate 47 and screwed into a respective one of the screw holes 45 of the holder body 41. Thus, the grass cutting blade 31 is attached to a lower end portion of the holder body 41 by means of the plurality of bolts 53 via the holder plate 47. In this condition, the opening peripheral edge portion 49 of the holder plate 47 protrudes inward of the central fitting section 43 of the holder body 41.

As shown in FIG. 3, an annular space 57 is formed between the opening peripheral edge portion 49 of the holder plate 47 and the hub's protruding section 35 and between the lower portion 16a of the output shaft 16 and the fitting section 43 of the holder body 41. The hub's protruding section 35 and lower portion 16a of the output shaft 16 constitute members 52 peripheral to the blade holder 28.

In the annular space 57, an inner collar 61 is press-fitted on the lower portion 16a of the output shaft 16, and an outer collar 63 is press-fitted in the fitting section 43. The inner collar 61, which has a cylindrical shape, includes a flange (inner flange) 62 projecting outward from its lower end portion, and the inner flange 62 is held in abutting engagement with a washer 73 and the opening peripheral edge portion 49. The washer 73 is disposed inward of and coaxially with the opening peripheral edge portion 49. The outer collar 63, which also has a cylindrical shape, includes a flange (outer flange) 64 projecting inward from its upper end portion, and the outer flange 64 is held in abutting engagement with the protruding section 44 of the holder body 41.

Further, in the annular space 57, the annular energy absorbing member 32 is disposed between the inner flange 62 and the outer flange 64. In other words, the annular energy absorbing member 32 is disposed between the opening peripheral edge portion 49 of the holder plate 47 and the protruding section 35 of the drive hub 26.

Figure 4:
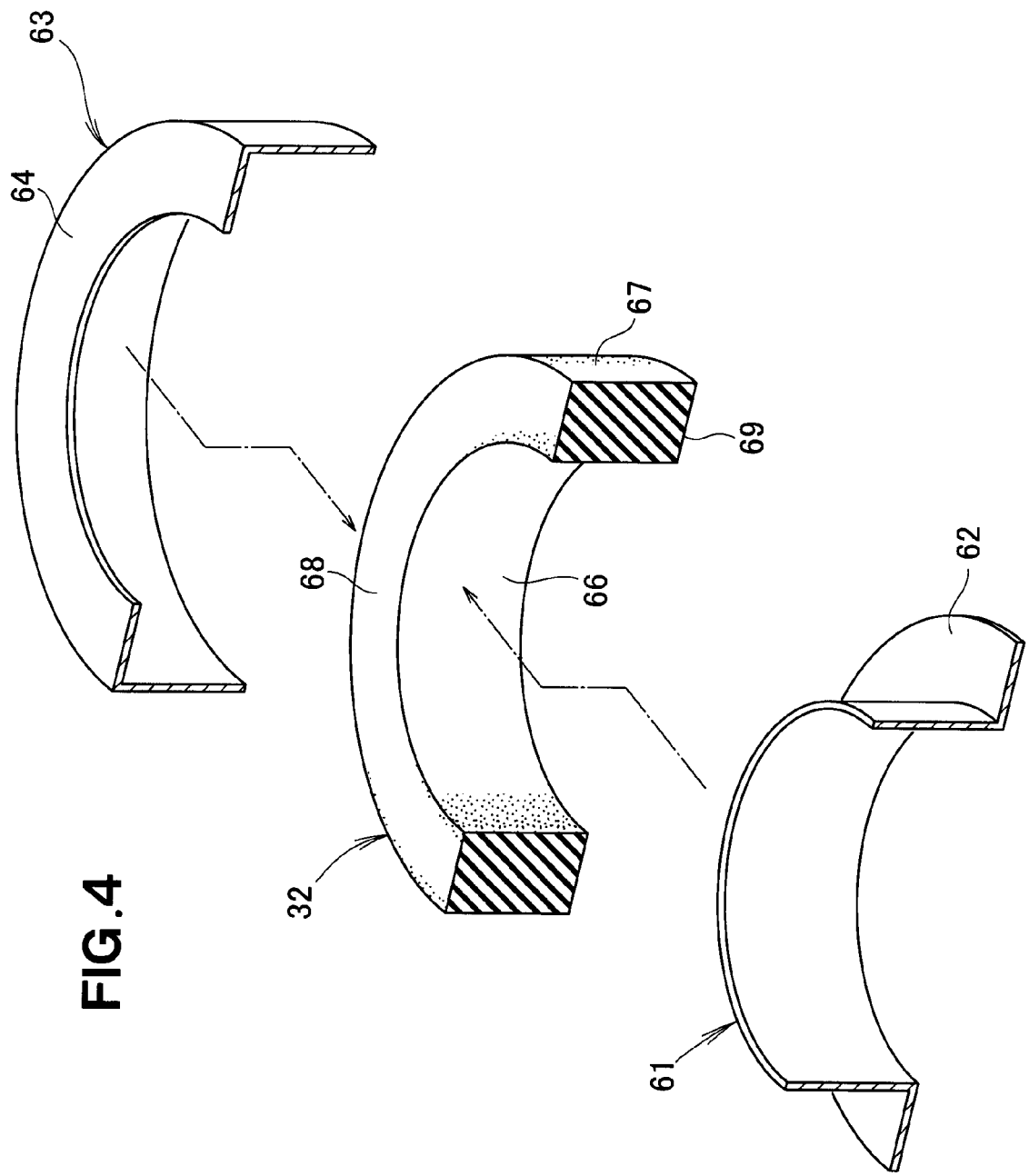
FIG. 4 is an exploded perspective view showing relationship among an energy absorbing member, an inner color and an outer collar of FIG. 3.

Further, as shown in FIG. 4, the energy absorbing member 32 is a rubber member that is formed in an annular shape with the inner peripheral surface 66, outer peripheral surface 67, upper surface 68 and lower surface 69, and that has a substantially rectangular sectional shape. The energy absorbing member 32 thus formed in an annular shape can be suitably disposed in the annular space 57 (see FIG. 3).

By being formed in an annular shape in accordance with the annular shape of the space 57 as noted above, the energy absorbing member 32 can be readily assembled between the inner collar 61 and the outer collar 63 in the space 57.

Further, by forming the energy absorbing member 32 in an annular shape and in a simple substantially rectangular sectional shape as noted above, it is possible to reduce manufacturing cost of the energy absorbing member 32. The energy absorbing member 32 is formed of rubber such that it maintains its shape, against deformation, during normal grass cutting operation (normal operating condition) by the cutting blade 31 (FIG. 2) but deforms when a load (impact load) exceeding a predetermined value has acted on the energy absorbing member 32.

Referring back to FIG. 3, the outer collar 63 is press-fitted from below in the fitting section 43 of the holder body 41, so that the outer flange 64 is abutted against the holder's protruding section 44. Thus, the outer flange 64 is held positioned vertically relative to the holder body 41. The inner collar 61 is, on the other hand, press-fitted from below on the lower portion 16a of the output shaft 16, and a bolt 72 is screwed into a screw hole 71 of the output shaft 16. The inner flange 62 is pressed from below by the washer 73 so that it is held positioned vertically relative to the output shaft 16.

In this condition, the upper surface 68 of the energy absorbing member 32 is abutted against the outer flange 64, while the lower surface 69 of the energy absorbing member 32 is abutted against the inner flange 62. Further, the opening peripheral edge portion 49 of the holder plate 47 is abutted against the inner flange 62. Because the energy absorbing member 32 is constructed to maintain its shape, against deformation, during normal operating condition, the holder body 41 is held positioned vertically by means of the outer flange 64, the energy absorbing member 32, the inner flange 62 and the opening peripheral edge portion 49.

By being attached to the lower surface 41a by the plurality of bolts 53 via the holder plate 47, the grass cutting blade 31 is held positioned vertically and centered accurately relative to the output shaft 16. Thus, in assembling the grass cutting blade 31 to the lawn mower, operation for centering the grass cutting blade 31 can be performed with ease without taking much time and labor.

If an impact load exceeding a predetermined value has acted on the energy absorbing member 32, the energy absorbing member 32 deforms, so that the impact load can be absorbed by the frictional curved surface 38 being slid relative to the hub's curved surface 36 in the direction of arrow A and in the direction of arrow B.

As further shown in FIG. 3, by being disposed in the annular space 57, the energy absorbing member 32 is positioned around the entire periphery of the lower portion 16a of the output shaft 16. Thus, when an impact load has been input from a certain position along the periphery of the output shaft 16, the energy absorbing member 32 can be deformed suitably by the input impact load. In this way, the impact load input from the certain position along the periphery of the output shaft 16 can be absorbed suitably by the friction member 27 being moved vertically (in the direction of arrow B of FIG. 2) relative to the drive hub 26.

Figure 5A:
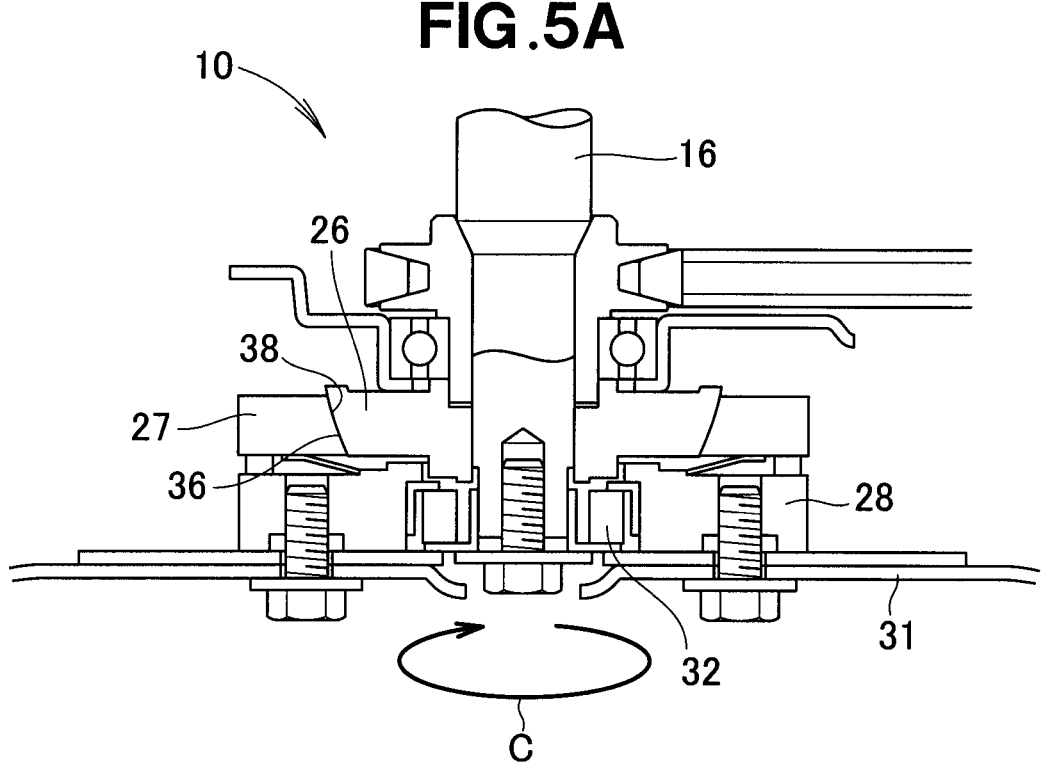
FIGS. 5A and 5B are views explanatory of an example manner in which a horizontal impact load is absorbed by the first embodiment of the blade mounting structure.
Figure 5B:
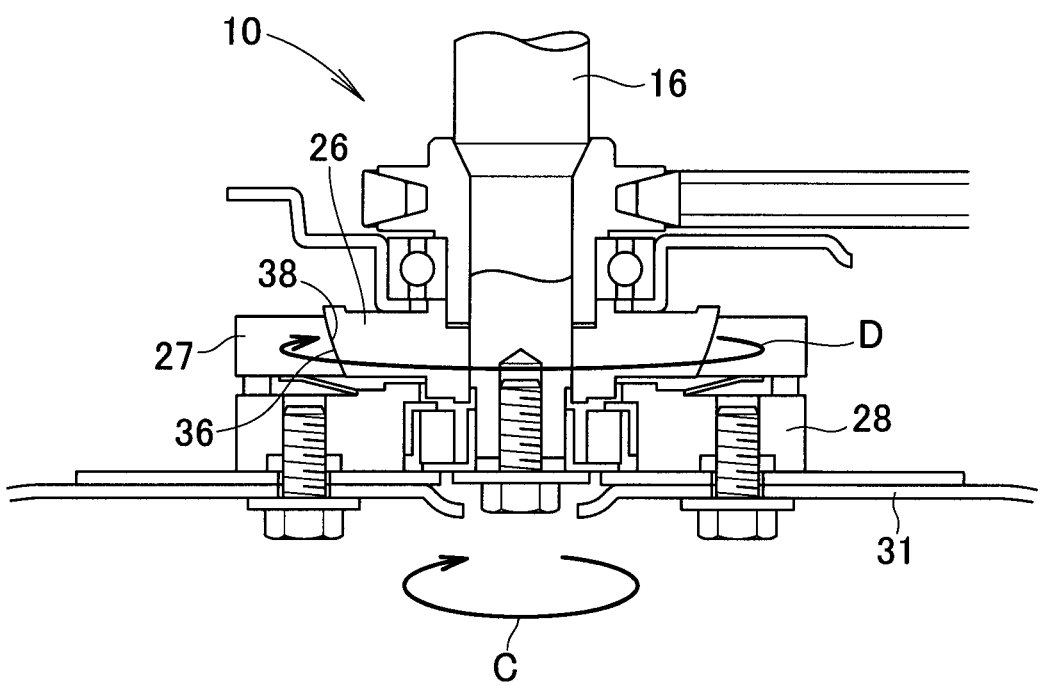
Figure 6:
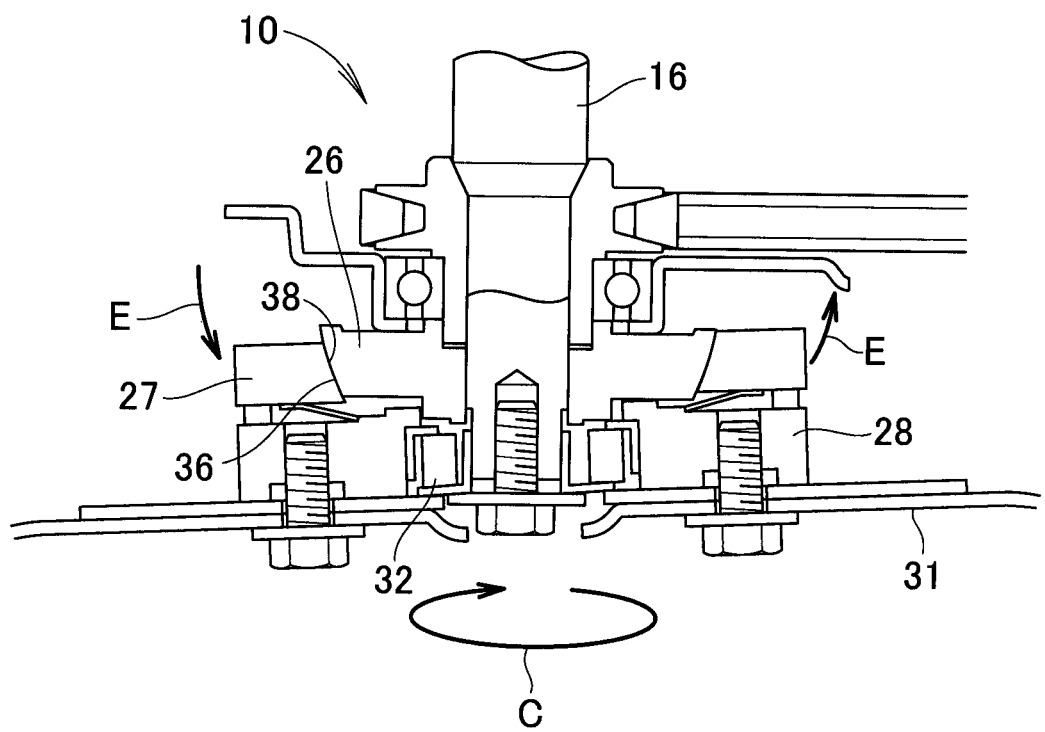
FIG. 6 is a view explanatory of an example manner in which a vertical impact load is absorbed by the first embodiment of the blade mounting structure.

The following describe, with reference to FIGS. 5 and 6, an example manner in which an impact load is absorbed by the first embodiment of the blade mounting structure 20.

As shown in FIG. 5A, the driving force of the engine 15 (FIG. 1) is transmitted via the output shaft 16 to the drive hub 26. Then, the driving force is transmitted from the drive hub 26 to the friction member 27 by friction force produced between the hub's curved surface 36 and the frictional curved surface 38 of the friction member 27. Thus, the driving force is transmitted via the friction member 27 to the blade holder 28, so that the grass cutting blade 31 is rotated in a direction of arrow C together with the blade holder 28.

During the normal grass cutting operation by the cutting blade 31, the energy absorbing member 32 maintains its shape against deformation, and the energy absorbing member 32 rotates together with the blade holder 28 and the output shaft 16. By the rotation of the grass cutting blade 31, the walk-behind lawn mower 10 cuts or clips grass while being propelled to travel (self-traveling).

As shown in FIG. 5B, during the grass cutting operation by the grass cutting blade 31, the grass cutting blade 31 can hit an obstacle, such as a sprinkler (not shown). Once the grass cutting blade 31 hits an obstacle, an impact load is input which would rotate the frictional curved surface 38 in a horizontal direction (direction of arrow D) relative to the hub's curved surface 36.

The impact load produced by the grass cutting blade 31 hitting the obstacle is transmitted to the grass cutting blade 31 and the blade holder 28, and a load exceeding a predetermined value acts on the energy absorbing member 32. If such a load exceeding the predetermined value has acted on the energy absorbing member 32, the energy absorbing member 32 can deform. By the deformation of the energy absorbing member 32, the frictional curved surface 38 is slid relative to the hub's curved surface 36 as indicated by arrow D. By the sliding movement as indicated by arrow D, the impact load is converted into heat energy and absorbed, so that the output shaft 16 can be protected from the impact load.

When the grass cutting blade 31 has hit the obstacle during the grass cutting operation by the grass cutting blade 31, an impact load is also input which would move the friction member 27 relative to the drive hub 26 in a vertical direction (direction of arrow E), as shown in FIG. 6. The input impact load is transmitted to the grass cutting blade 31 and the blade holder 28, so that a load exceeding a predetermined value acts on the energy absorbing member 32. The load exceeding the predetermined value acting on the energy absorbing member 32 can deform the energy absorbing member 32. By the deformation of the energy absorbing member 32, the frictional curved surface 38 is slid relative to the hub's curved surface 36 as indicated by arrow E. By the sliding movement as indicated by arrow E, the impact load is converted into heat energy and absorbed, so that the output shaft 16 can be protected from the impact load.

Next, with reference to FIGS. 7 to 17, a description will be given about second to sixth embodiments of the blade mounting structure of the present invention, where elements identical or similar to the elements in the first embodiment are represented by the same reference numerals as in the first embodiment and will not be described here to avoid unnecessary duplication.

Figure 7:
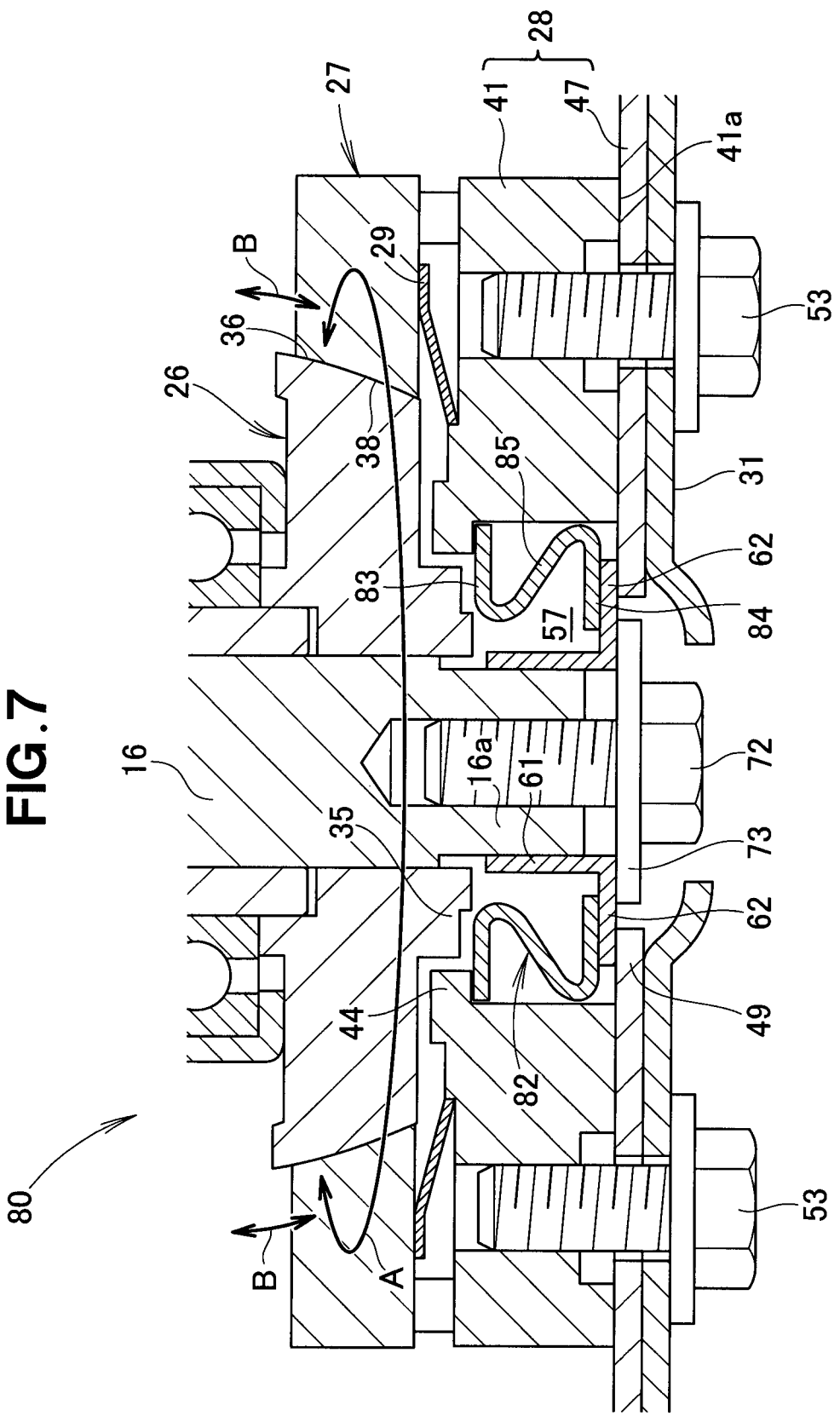
FIG. 7 is a sectional view of a second embodiment of the blade mounting structure of the present invention.

First, the second embodiment of the blade mounting structure 80 will be described with reference to FIGS. 7 and 8. As shown in FIG. 7, the second embodiment of the blade mounting structure 80 is characterized in that the energy absorbing member 32 in the first embodiment of the blade mounting structure 20 is replaced with an energy absorbing member 82 and that the outer collar 63 in the first embodiment is omitted; the other structural features of the second embodiment are substantially similar to those of the first embodiment of the blade mounting structure 20.

Figure 8:
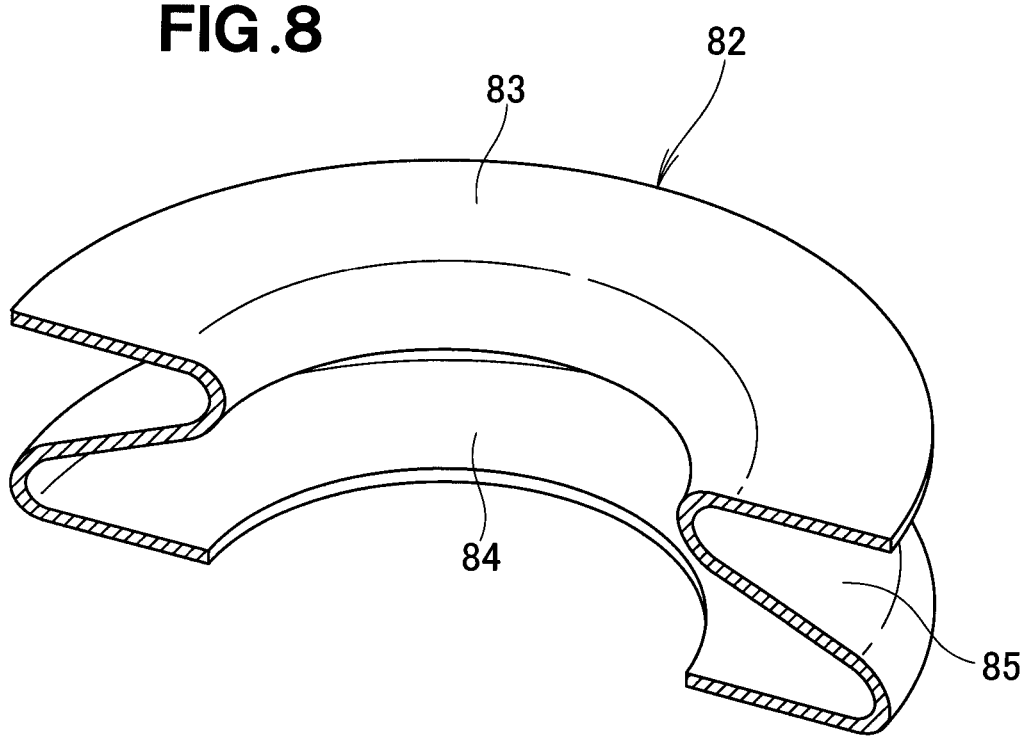
FIG. 8 is a perspective view of an energy absorbing member of FIG. 7.

As shown in FIG. 8, the energy absorbing member 82 is a member formed of soft steel or resin and has a substantially bellows-like (Z) sectional shape defined with an upper portion 83, a lower portion 84 and a slanting portion 85. The upper portion 83 and the lower portion 84 are formed to extend horizontally.

The energy absorbing member 82 in the second embodiment has an annular shape like the energy absorbing member 32 in the first embodiment, so that the energy absorbing member 82 is disposed suitably in the annular space 57. By being formed in an annular shape in accordance with the annular shape of the space 57 (see FIG. 7), the energy absorbing member 82 can be readily assembled into the space 57.

The energy absorbing member 82 is formed of soft steel or resin such that it maintains its shape, against deformation, during the normal grass cutting operation by the cutting blade 31 (FIG. 7) but deforms when a load (impact load) exceeding a predetermined value has acted on the energy absorbing member 82. By being formed in the bellows-like (Z) sectional shape, setting of predetermined values with respect to vertical compression force and horizontal twisting force can be facilitated.

Referring back to FIG. 7, the upper portion 83 of the energy absorbing member 82 is abutted from below against the holder's protruding section 44. Further, the inner flange 62 of the inner collar 61 is held positioned vertically (in the up-down direction) relative to the output shaft 16.

In this condition, the lower portion 84 of the energy absorbing member 82 is abutted against the inner flange 62, and the opening peripheral edge portion 49 of the holder plate 47 is abutted against the inner flange 62.

Because the energy absorbing member 82 maintains its shape, against deformation, during the operating condition, the holder body 41 is held positioned vertically by means of the energy absorbing member 82, the inner flange 62 and the opening peripheral edge portion 49.

By being attached to the lower surface 41a of the holder body 41 via the holder plate 47, the grass cutting blade 31 is held positioned vertically and centered accurately relative to the output shaft 16. Thus, in assembling the grass cutting blade 31, the operation for centering the grass cutting blade 31 can be performed with ease without taking much time and labor.

During the normal grass cutting operation by the cutting blade 31, the energy absorbing member 82 maintains its shape against deformation, and the energy absorbing member 82 rotates together with the blade holder 28 and the output shaft 16, so that the grass cutting blade 31 can cut grass in an appropriate manner.

If a load exceeding a predetermined value has acted on the energy absorbing member 32, the energy absorbing member 32 deforms, so that the load can be absorbed by the frictional curved surface 38 being slid relative to the hub's curved surface 36 in the direction of arrow A and in the direction of arrow B.

Further, by being disposed in the annular space 57, the energy absorbing member 82 is positioned around the entire periphery of the lower portion 16a of the output shaft 16. Thus, when an impact load has been input from a certain position along the periphery of the lower portion 16a of the output shaft 16, the energy absorbing member 82 can be deformed suitably by the input impact load. In this way, the impact load input from the certain position along the periphery of the output shaft 16 can be absorbed suitably by the friction member 27 being moved vertically (in the direction of arrow B of FIG. 2) relative to the drive hub 26.

The second embodiment of the blade mounting structure 80 constructed in the aforementioned manner can achieve the same advantageous benefits as the first embodiment of the blade mounting structure 20. In addition, the second embodiment of the blade mounting structure 80 can omit or dispense with the outer collar 63 by abutting the upper portion 83 of the energy absorbing member 82 against the holder's protruding section 44. In this way, it is possible to reduce the number of component parts of the blade mounting structure 80 and facilitate the operation for assembling the blade mounting structure 80.

Figure 9:
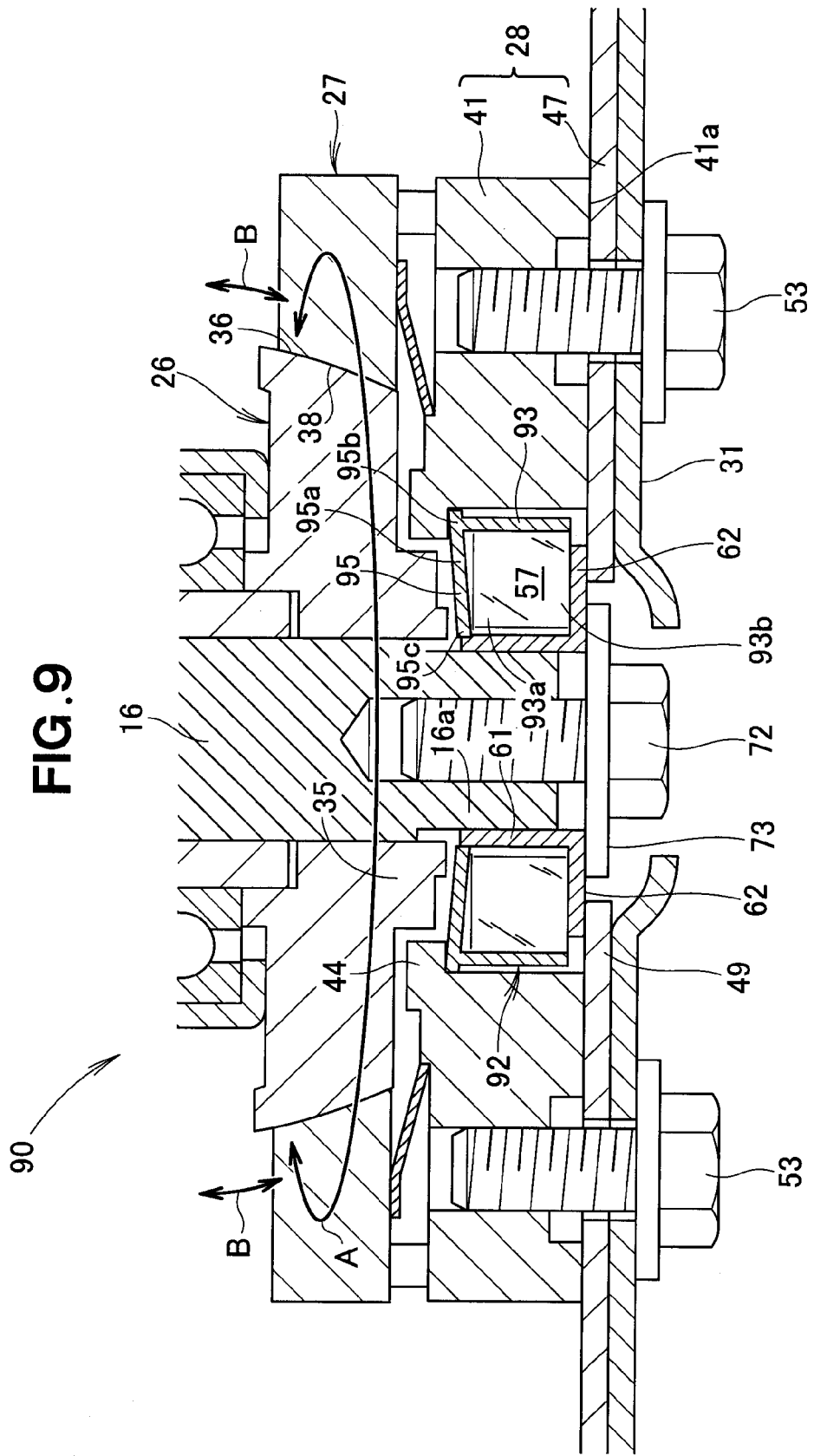
FIG. 9 is a sectional view of a third embodiment of the blade mounting structure of the present invention.

Next, with reference to FIGS. 9 and 10, a description will be given about the third embodiment of the present invention 90. As shown in FIG. 9, the third embodiment of the blade mounting structure 90 is characterized in that the energy absorbing member 32 in the first embodiment of the blade mounting structure 20 is replaced with an energy absorbing member 92 and that the outer collar 63 in the first embodiment is omitted; the other structural features of the third embodiment are substantially similar to those of the first embodiment of the blade mounting structure 20.

Figure 10A:
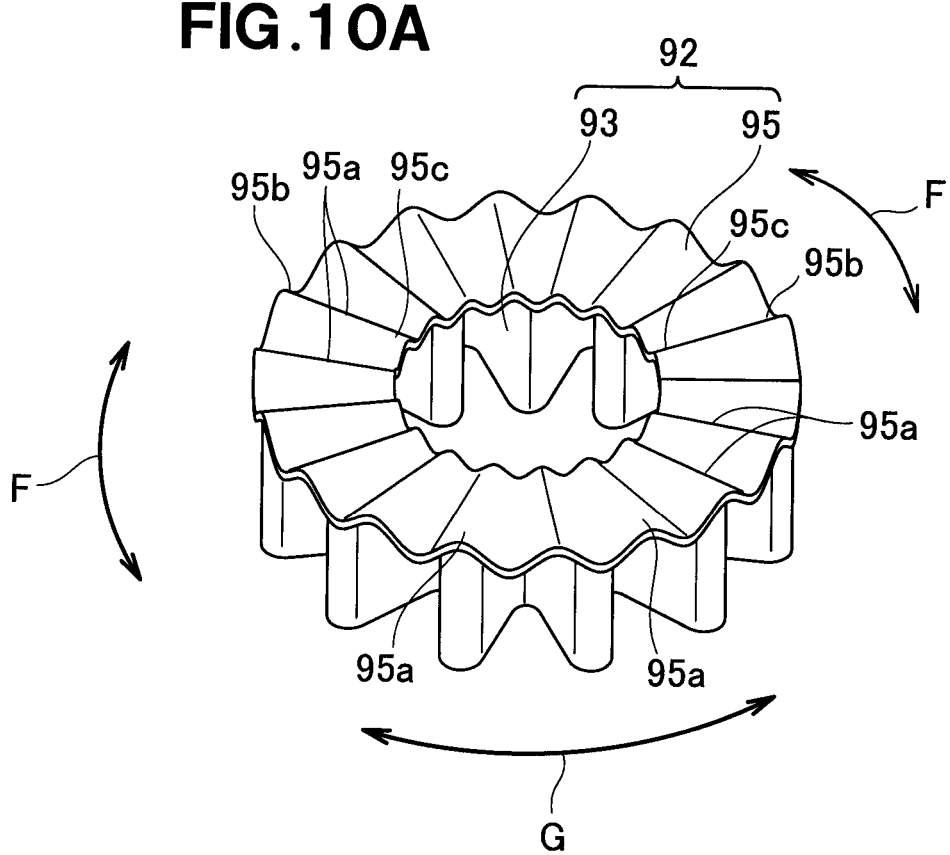
FIG. 10A is an upper perspective view of an energy absorbing member shown in FIG. 9.
Figure 10B:
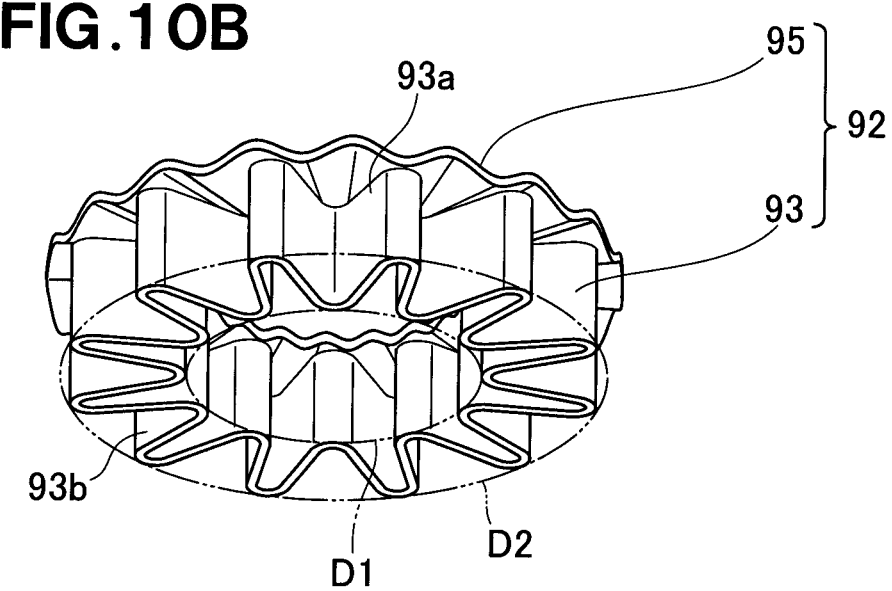
FIG. 10B is a lower perspective view of the energy absorbing member shown in FIG. 9.

As shown in FIG. 10, the energy absorbing member 92 is an annular member formed of soft steel or resin and has a peripheral side wall section 93 of an annular shape, and an annular upper plate 95 provided on an upper end portion 93a of the peripheral side wall section 93. The third embodiment of the blade mounting structure 90 will be described in relation to a case where the energy absorbing member 92 is formed of resin.

The peripheral side wall section 93 is bent at a plurality of positions thereof in such a manner that it projects from an imaginary circle of a small diameter D1 to an imaginary circle of a large diameter D2 with respect to a circumferential direction to thereby form a convex-concave shape (bellows-like shape).

The annular upper plate 95 is formed in such an annular shape as to be capable of being provided on the upper end portion 93a of the peripheral side wall section 93 and in a convex-concave shape (bellows-like shape) with respect to the vertical (up-down) direction. More specifically, the upper plate 95 has a plurality of upwardly bent portions (upward projecting portions) 95a each slanting downward from an outer peripheral edge portion 95b to an inner peripheral edge portion 95c.

Thus, the energy absorbing member 92 is formed in an annular shape with the peripheral side wall section 93 and the upper plate 95. The energy absorbing member 92 thus formed in an annular shape can be suitably disposed in the annular space 57 (see FIG. 9). By being formed in an annular shape in accordance with the annular shape of the space 57 as noted above, the energy absorbing member 92 can be readily assembled into the space 57.

Further, the energy absorbing member 92 is formed of soft steel or resin such that it maintains its shape, against deformation, during the normal grass cutting operation by the cutting blade 31 (FIG. 9) but deforms when a load (impact load) exceeding a predetermined value has acted on the energy absorbing member 92.

Furthermore, in the third embodiment, the peripheral side wall section 93 of the energy absorbing member 92 is formed in a convex-concave shape (bellows-like shape) with respect to the circumferential direction, and the upper plate 95 is formed in a convex-concave shape (bellows-like shape) with respect to the vertical direction. Thus, setting of predetermined values with respect to compression force in the vertical direction (direction of arrow F in FIG. 10A) and twisting force in a horizontal direction of arrow G can be facilitated.

Referring back to FIG. 9, the plurality of the outer peripheral edge portions 95b (see FIG. 10) of the upper plate 95 of the energy absorbing member 92 are abutted from below against the holder's protruding section 44. Further, the inner flange 62 of the inner collar 61 is held positioned vertically (in the up-down direction) relative to the output shaft 16.

In this condition, a lower end portion 93b of the peripheral side wall section 93 of the energy absorbing member 92 is abutted against the inner flange 62, and further, the opening peripheral edge portion 49 of the holder body 41 is abutted against the inner flange 62.

In the third embodiment too, the energy absorbing member 92 maintains its shape, against deformation, during the normal operating condition, and thus, the holder body 41 is held positioned vertically by means of the energy absorbing member 92, the inner flange 62 and the opening peripheral edge portion 49.

By being attached to the lower surface 41a of the holder body 41 via the holder plate 47, the grass cutting blade 31 is held positioned vertically and centered accurately relative to the output shaft 16. Thus, in assembling the grass cutting blade 31, the operation for centering the grass cutting blade 31 can be performed with ease without taking much time and labor.

Further, because, during the normal grass cutting operation by the cutting blade 31, the energy absorbing member 92 maintains its shape against deformation, the energy absorbing member 92 rotates together with the blade holder 28 and the output shaft 16, so that the grass cutting blade 31 can cut grass in an appropriate manner.

If a load exceeding a predetermined value has acted on the energy absorbing member 92, the energy absorbing member 92 deforms, so that the load can be absorbed by the frictional curved surface 38 being slid relative to the hub's curved surface 36 in the direction of arrow A and in the direction of arrow B.

Further, by being disposed in the annular space 57, the energy absorbing member 92 is positioned around the entire periphery of the lower portion 16a of the output shaft 16. Thus, when an impact load has been input from a certain position along the periphery of the lower portion 16a of the output shaft 16, the energy absorbing member 92 can be deformed suitably by the input impact load. In this way, the impact load input from the certain position along the periphery of the output shaft 16 can be absorbed suitably by the friction member 27 being moved vertically (in the direction of arrow B in FIG. 9) relative to the drive hub 26.

The third embodiment of the blade mounting structure 90 constructed in the aforementioned manner can achieve the same advantageous benefits as the first embodiment of the blade mounting structure 20. Further, the third embodiment of the blade mounting structure 90 can omit or dispense with the outer collar 63 by abutting the outer peripheral edge portions 95b of the energy absorbing member 92 (upper plate) against the holder's protruding section 44. In this way, it is possible to reduce the number of component parts of the blade mounting structure 90 and facilitate the operation for assembling the blade mounting structure 90.

Note that, whereas the third embodiment has been described above in relation to the case where each of the upward bent potions 95a of the upper plate 95 is formed to slant downward from the outer peripheral edge portion 95b to the inner peripheral edge portion 95c, the present invention is not so limited, and each of the upward bent potions 95a of the upper plate 95 may be formed to extend horizontally from the outer peripheral edge portion 95b to the inner peripheral edge portion 95c. Even with the upward bent potions 95a extending horizontally like this, the same advantageous benefits as the above-described third embodiment can be achieved.

Figure 11:
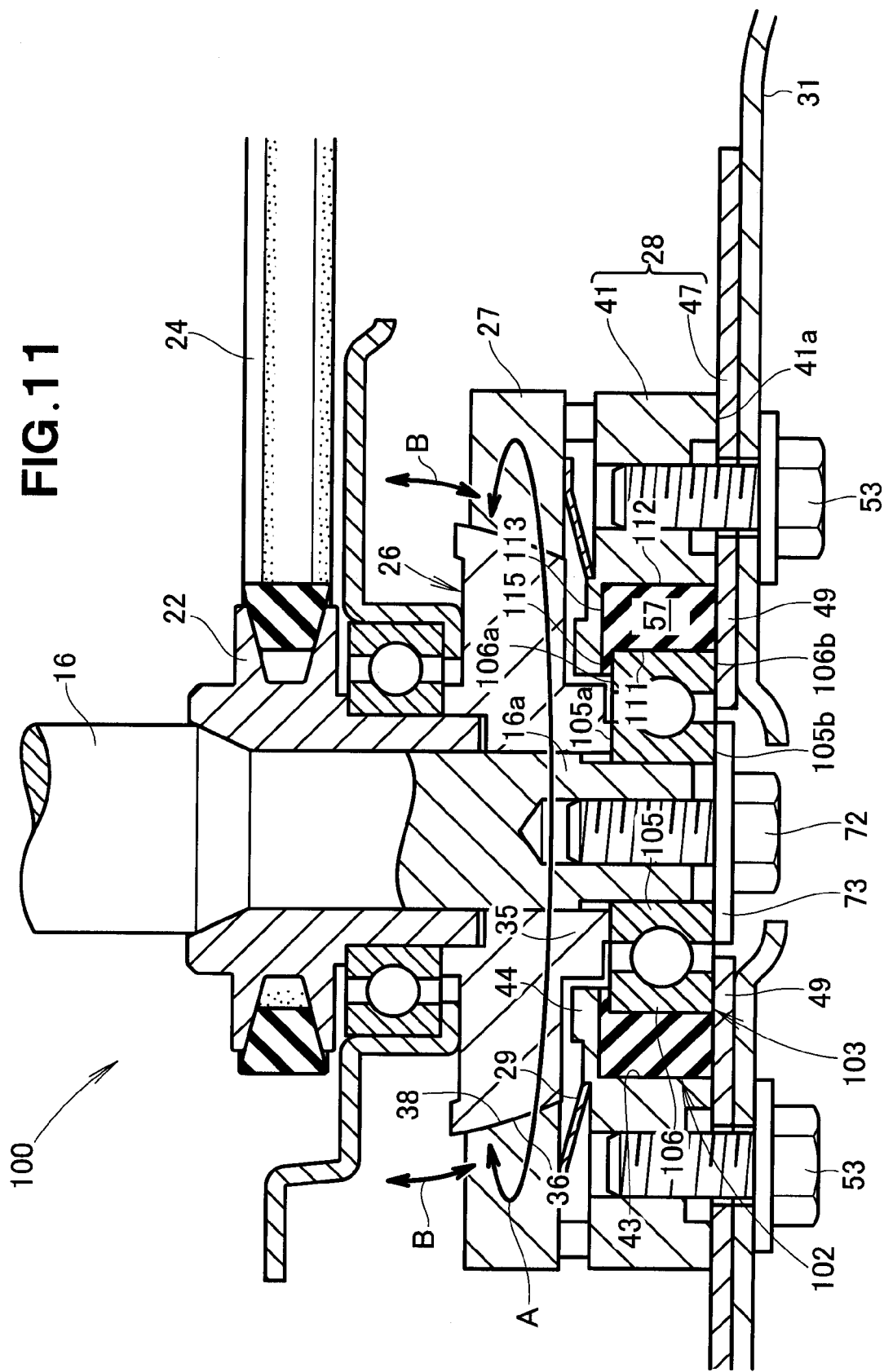
FIG. 11 is a sectional view of a fourth embodiment of the blade mounting structure of the present invention.

Next, with reference to FIGS. 11 to 13, a description will be given about the fourth embodiment of the blade mounting structure 100 of the present invention. As shown in FIG. 11, the fourth embodiment of the blade mounting structure 100 is characterized in that the energy absorbing member 32 in the first embodiment of the blade mounting structure 20 is replaced with an energy absorbing member 102 and that a bearing 103 is provided between the energy absorbing member 102 and the output shaft 16; the other structural features of the fourth embodiment are substantially similar to those of the first embodiment of the blade mounting structure 20.

The bearing 103 is a ball bearing whose inner ring 105 is press-fitted from below on the lower portion 16a of the output shaft 16. In this condition, the upper surface 105a of the inner ring 105 is abutted against the hub's protruding section 35, while the lower surface 105b of the inner ring 105 is abutted against the washer 73. Thus, the bearing 103 is held positioned in the space 57.

The bearing 103, provided on the lower portion 16a of the output shaft 16, allows the rotation of the grass cutting blade 31 to be stopped with the rotation of the output shaft 16 still maintained.

The walk-behind lawn mower equipped with the fourth embodiment of the blade mounting structure 100 is constructed to include a blade brake clutch mechanism. With such a blade brake clutch mechanism, the frictional curved surface 38 can be spaced downward from the hub's curved surface 36 against the biasing force of the coned disk spring 29. Thus, the rotation of the grass cutting blade 31 can be stopped by the brake with the rotation of the output shaft 16 still maintained.

Figure 12:
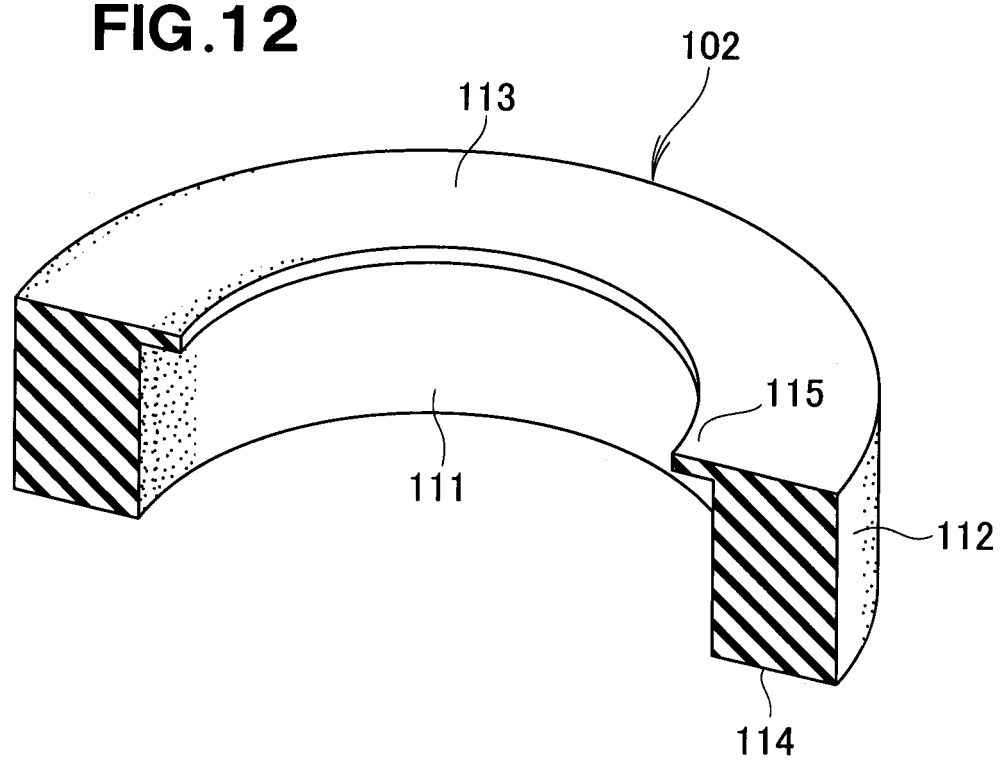
FIG. 12 is a perspective view of an energy absorbing member shown in FIG. 11.

Further, as shown in FIG. 12, the energy absorbing member 102 is a rubber member that is formed in an annular shape and in a substantially rectangular sectional shape defined with the inner peripheral surface 111, outer peripheral surface 112, upper surface 113 and lower surface 114. The energy absorbing member 102 also has an upper flange 115 projecting inward from an intersection between the inner peripheral surface 111 and the upper surface 113. The energy absorbing member 102 thus formed in an annular shape can be suitably disposed in the annular space 57.

By being formed in an annular shape in accordance with the annular shape of the space 57 as noted above, the energy absorbing member 102 can be readily assembled to between the outer ring 106 and the fitting section 43. Further, by forming the energy absorbing member 102 in an annular shape and in a simple substantially rectangular sectional shape as noted above, it is possible to reduce manufacturing cost of the energy absorbing member 102.

In the fourth embodiment too, the energy absorbing member 102 is formed of rubber such that it maintains its shape, against deformation, during the normal grass cutting operation by the cutting blade 31 (see FIG. 11) but deforms when a load exceeding a predetermined value has acted on the energy absorbing member 102.

Further, as shown in FIG. 11, the upper surface 113 and the upper flange 115 of the energy absorbing member 102 are abutted from below against the holder's protruding section 44, and the upper flange 115 is abutted from above against the upper surface 106a of the outer ring 106. Namely, the upper flange 115 is disposed between the holder's protruding section 44 and the upper surface 106a of the outer ring 106, and the holder's protruding section 44 is spaced upward from the upper surface 106a of the outer ring 106.

Furthermore, the opening peripheral edge portion 49 of the holder plate 47 is abutted from below against the lower surface 114 of the energy absorbing member 102 but also abutted from below against the lower surface 106b of the outer ring 106.

Because the energy absorbing member 102 maintains its shape, against deformation, during the normal condition, the holder body 41 is held positioned in the vertical direction by the bearing 103, the energy absorbing member 102 and the opening peripheral edge portion 49.

Further, by being attached to the lower surface 41a of the holder body 41 via the holder plate 47, the grass cutting blade 31 is held positioned vertically and centered accurately relative to the output shaft 16. Thus, in assembling the grass cutting blade 31, the operation for centering the grass cutting blade 31 can be performed with ease without taking much time and labor.

Further, because the energy absorbing member 102 maintains its shape against deformation during the normal grass cutting operation by the cutting blade 31, the energy absorbing member 102 rotates together with the blade holder 28 and the output shaft 16, so that the grass cutting blade 31 can cut grass in an appropriate manner.

Figure 13A:
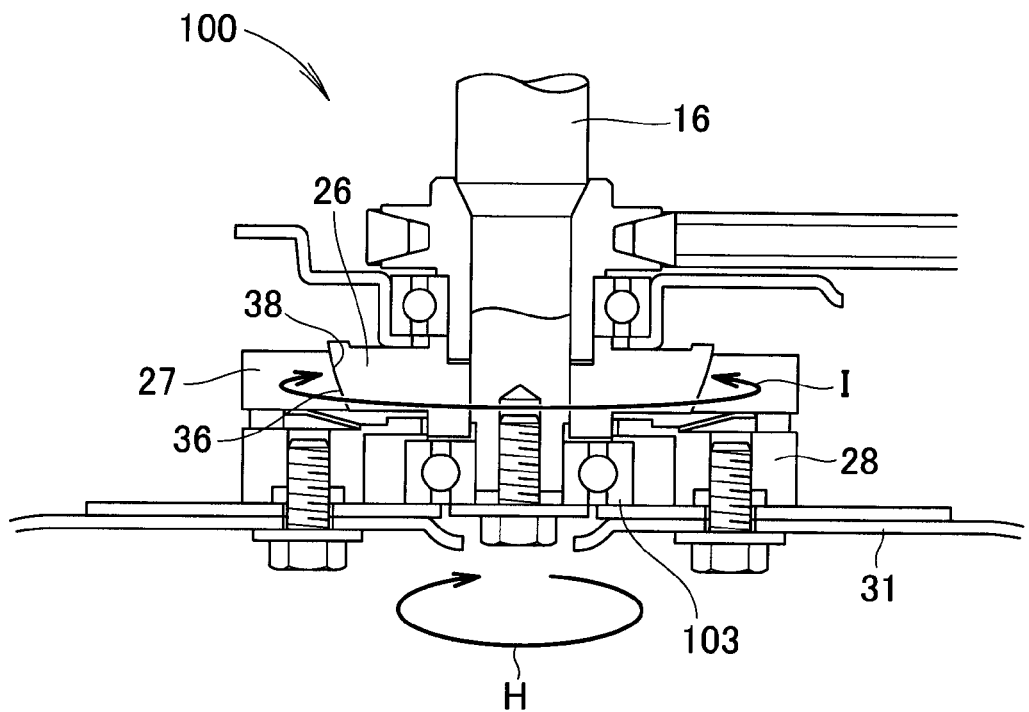
FIGS. 13A and 13B are views explanatory of an example manner in which an impact load is absorbed by the fourth embodiment of the blade mounting structure.
Figure 13B:
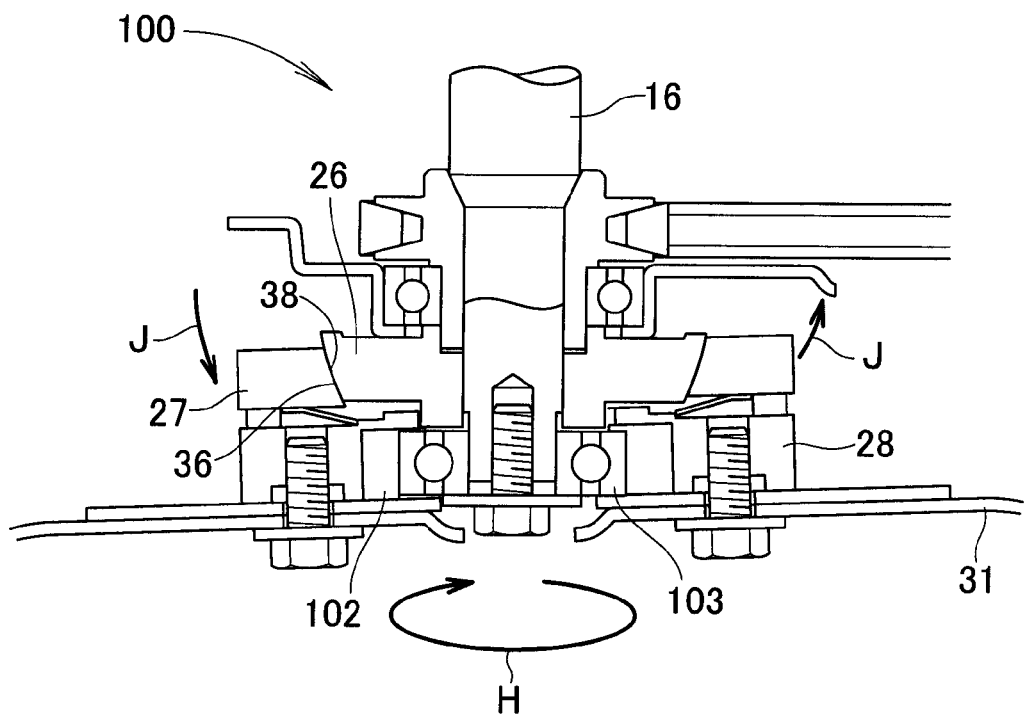

The following describe, with reference to FIGS. 13A and 13B, an example manner in which an impact load is absorbed by the fourth embodiment of the blade mounting structure 100. The lawn mower 10 cuts grass by rotating the grass cutting blade 31 as indicated by arrow H in FIG. 13A. During the grass cutting operation, the grass cutting blade 31 can hit an obstacle, such as a sprinkler. Once the grass cutting blade 31 hits an obstacle, an impact load is input which would rotate the frictional curved surface 38 in a horizontal direction (direction of arrow I in FIG. 13A) relative to the hub's curved surface 36.

Such an input impact load is transmitted to the grass cutting blade 31 and the blade holder 28, so that a load exceeding a predetermined value acts on the energy absorbing member 102. The load exceeding the predetermined value acting on the energy absorbing member 102 can deform the energy absorbing member 102. Thus, by the deformation of the energy absorbing member 102, the frictional curved surface 38 is slid relative to the hub's curved surface 36 as indicated by arrow I. By the sliding movement as indicated by arrow I, the impact load is converted into heat energy and absorbed, so that the output shaft 16 can be protected from the impact load.

When the grass cutting blade 31 hits an obstacle during the grass cutting operation by the grass cutting blade 31, an impact load is input which would move the friction member 27 relative to the drive hub 26 in the vertical direction (direction of arrow J in FIG. 13B). The input impact load is transmitted to the grass cutting blade 31 and the blade holder 28, so that a load exceeding a predetermined value acts on the energy absorbing member 102. Because the upper flange 115 is disposed between the holder's protruding section 44 and the upper surface 106a of the outer ring 106, and the holder's protruding section 44 is spaced upward from the upper surface 106a of the outer ring 106.

Thus, by the deformation of the he energy absorbing member 102, the frictional curved surface 38 can be slid relative to the hub's curved surface 36 as indicated by arrow J in FIG. 13B. By the sliding movement as indicated by arrow J, the impact load is converted into heat energy and absorbed, so that the output shaft 16 can be protected from the impact load.

Referring back to FIG. 11, by being disposed in the annular space 57, the energy absorbing member 102 is positioned around the entire periphery of the lower portion 16a of the output shaft 16. Thus, when an impact load has been input from a certain position along the periphery of the lower portion 16a of the output shaft 16, the energy absorbing member 102 can be deformed suitably by the input impact load.

Thus, the fourth embodiment of the blade mounting structure 100 can suitably absorb the impact load input from the certain position along the periphery of the lower portion 16a of the output shaft 16, by moving the friction member 27 relative to the drive hub 26 in the vertical direction (direction of arrow B in FIG. 11). In this way, the fourth embodiment of the blade mounting structure 100 constructed in the aforementioned manner can achieve the same advantageous benefits as the first embodiment of the blade mounting structure 20.

Next, with reference to FIGS. 14 and 15, a description will be given about the fifth fourth embodiment of the blade mounting structure 120 of the invention. As shown in FIG. 14, the fifth embodiment of the blade mounting structure 120 is characterized in that the energy absorbing member 102 in the fourth embodiment of the blade mounting structure 100 is replaced with an energy absorbing member 122; the other structural features of the fifth embodiment are substantially similar to those of the fourth embodiment of the blade mounting structure 100.

Figure 15:
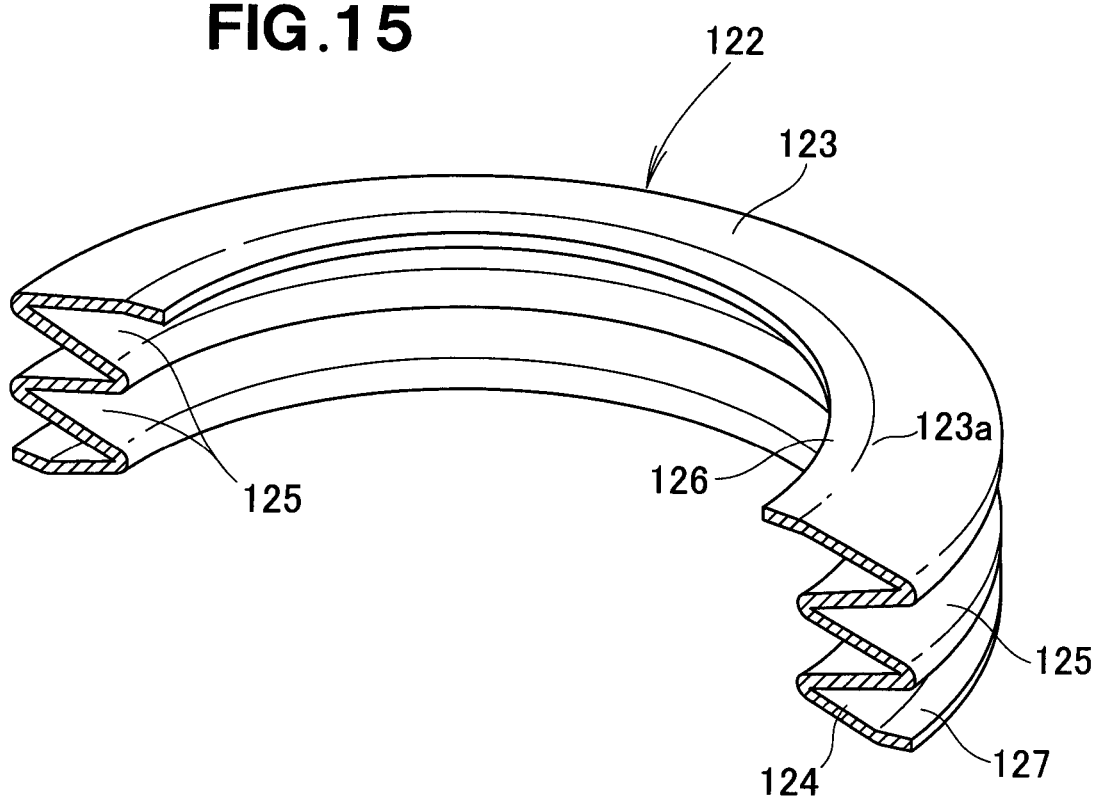
FIG. 15 is a perspective view of an energy absorbing member shown in FIG. 14.

As shown in FIG. 15, the energy absorbing member 122, which is an annular member formed of soft steel or resin, has a substantially bellows-like sectional shape defined with a slanting upper section 123, a slanting lower section 124 and a plurality of connecting sections 125 formed by an intermediate portion, located between the upper and lower sections 123 and 124, being bent a plurality of times. The energy absorbing member 122 further has a flat upper flange 126 projecting flat inward from the inner peripheral edge 123a of the upper section 123, and an outer peripheral portion 127 of the lower section 124 extends flat.

By being formed in an annular shape, the energy absorbing member 122 can be suitably disposed in the annular space 57 (see FIG. 14). Also, by being formed in an annular shape in accordance with the annular shape of the space 57 as noted above, the energy absorbing member 122 can be readily assembled into the space 57.

In the fifth embodiment 120 too, the energy absorbing member 122 is formed of soft steel or resin such that it maintains its shape, against deformation, during the normal grass cutting operation by the cutting blade 31 (see FIG. 14) but deforms when a load (impact load) exceeding a predetermined value has acted on the energy absorbing member 122. By being formed in the bellows-like sectional shape, setting of predetermined values with respect to vertical compression force and horizontal twisting force can be facilitated.

Referring back to FIG. 14, the upper flange 126 of the energy absorbing member 122 is abutted from below against the holder's protruding section 44. Further, the upper flange 126 is abutted from above against the upper surface 106a of the outer ring 106. Namely, the upper flange 126 is disposed between the holder's protruding section 44 and the upper surface 106a of the outer ring 106 so that the holder's protruding section 44 is spaced upward from the upper surface 106a of the outer ring 106.

Further, the opening peripheral edge portion 49 of the holder plate 47 is abutted from below against the outer peripheral portion 127 of the energy absorbing member 122 but also abutted from below against the lower surface 106b of the outer ring 106.

Because the energy absorbing member 122 maintains its shape, against deformation, during the normal condition, the holder body 41 is held positioned in the vertical direction by the bearing 103, the energy absorbing member 122 and the opening peripheral edge portion 49.

Further, by being attached to the lower surface 41a of the holder body 41 via the holder plate 47, the grass cutting blade 31 is held positioned vertically and centered accurately relative to the output shaft 16. Thus, in assembling the grass cutting blade 31, the operation for centering the grass cutting blade 31 can be performed with ease without taking much time and labor.

Further, because the energy absorbing member 122 maintains its shape, against deformation, during the normal grass cutting operation by the cutting blade 31, the energy absorbing member 122 rotates together with the blade holder 28 and the output shaft 16, so that the grass cutting blade 31 can cut grass in an appropriate manner.

If a load exceeding the predetermined value has acted on the energy absorbing member 122, the energy absorbing member 122 deforms, so that the load can be absorbed by the frictional curved surface 38 being slid relative to the hub's curved surface 36 in the direction of arrow A and in the direction of arrow B.

Particularly, because the upper flange 126 is disposed between the holder's protruding section 44 and the upper surface 106*a* of the outer ring 106 so that the holder's protruding section 44 is spaced upward from the upper surface 106*a* of the outer ring 106, the frictional curved surface 38 can be slid relative to the hub's curved surface 36 in the direction of arrow B in FIG. 14.

Further, by being disposed in the annular space 57, the energy absorbing member 122 is positioned around the entire periphery of the lower portion 16*a* of the output shaft 16. Thus, when an impact load has been input from a certain position along the periphery of the lower portion 16*a* of the output shaft 16, the energy absorbing member 122 can be deformed suitably by the input impact load.

Thus, the fifth embodiment of the blade mounting structure 120 can suitably absorb the impact load input from the certain position along the periphery of the lower portion 16*a* of the output shaft 16, by moving the friction member 27 relative to the drive hub 26 in the vertical direction (direction of arrow B in FIG. 14). In this way, the fifth embodiment of the blade mounting structure 120 constructed in the aforementioned manner can achieve the same advantageous benefits as the fourth embodiment of the blade mounting structure 100.

Figure 16:
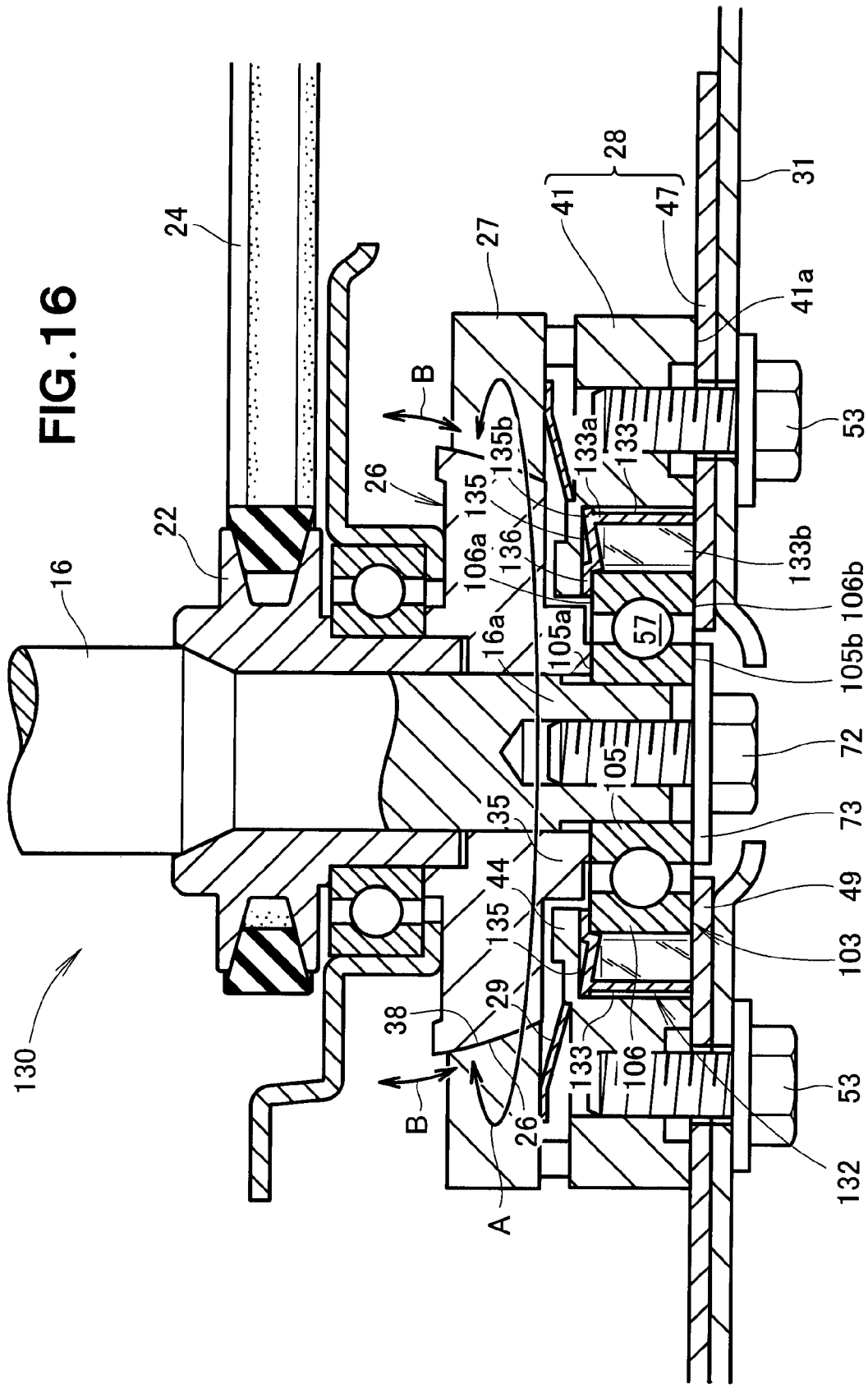
FIG. 16 is a sectional view of a sixth embodiment of the blade mounting structure of the present invention.

Next, with reference to FIGS. 16 and 17, a description will be given about the sixth embodiment of the blade mounting structure 130 of the present invention. As shown in FIG. 16, the sixth embodiment of the blade mounting structure 130 is characterized in that the energy absorbing member 102 in the fourth embodiment of the blade mounting structure 100 is replaced with an energy absorbing member 132; the other structural features of the sixth embodiment are substantially similar to those of the fourth embodiment of the blade mounting structure 100.

As shown in FIG. 17, the energy absorbing member 132, which is an annular member formed of soft steel or resin, has an annular peripheral side wall section 133, and an annular upper plate 135 provided on an upper end portion 133*a* of the peripheral side wall section 133. The sixth embodiment of the blade mounting structure 130 will be described in relation to a case where the energy absorbing member 132 is formed of resin.

Like the peripheral side wall section 93 in the third embodiment, the peripheral side wall section 133 is bent at a plurality of positions thereof in such a manner that it projects from an imaginary circle of a small diameter D3 to an imaginary circle of a large diameter D4 to thereby form a convex-concave shape (bellows-like shape) with respect to a circumferential direction of the peripheral side wall section 133.

The annular upper plate 135 is formed in such an annular shape as to be capable of being provided on the upper end portion 133*a* of the peripheral side wall section 133 and in a convex-concave shape (bellows-like shape) with respect to the vertical (up-down) direction, and the upper plate 135 has an upper flange 136 formed in an annular shape on and along the inner periphery thereof. More specifically, the upper plate 135 has a plurality of upwardly bent portions 135*a* each slanting downward from an outer peripheral edge portion 135*b* to an inner peripheral edge portion 135*c*. The outer peripheral edge portion 135*b* is located at generally the same height as the upper surface of the upper flange 136.

Thus, the energy absorbing member 132 is formed in an annular shape with the peripheral side wall section 133 and the upper plate 95. The energy absorbing member 132 thus formed in an annular shape can be suitably disposed in the annular space 57. By being formed in an annular shape as noted above, the energy absorbing member 132 can be readily assembled into the space 57.

In the sixth embodiment too, the energy absorbing member 132 maintains its shape, against deformation, during the normal grass cutting operation by the cutting blade 31 (see FIG. 16) but deforms when a load (impact load) exceeding a predetermined value has acted on the energy absorbing member 132.

Furthermore, in the sixth embodiment, the peripheral side wall section 133 of the energy absorbing member 132 is formed in a convex-concave shape (bellows-like shape) with respect to the circumferential direction, and the upper plate 135 is formed in a convex-concave shape (bellows-like shape) with respect to the vertical direction. Thus, setting of predetermined values with respect to compression force in the vertical direction (direction of arrow K in FIG. 17) and twisting force in a direction of arrow L can be facilitated.

Referring back to FIG. 16, the outer peripheral edge portion 135*b* of the upper plate 135 of the energy absorbing member 102 is abutted from below against the holder's protruding section 44, and the upper flange 136 of the upper plate 135 is abutted from above the upper surface 106*a* of the outer ring 106. Namely, the upper flange 136 is disposed between the holder's protruding section 44 and the upper surface 106*a* of the outer ring 106, and the holder's protruding section 44 is spaced upward from the upper surface 106*a* of the outer ring 106.

Furthermore, the opening peripheral edge portion 49 of the holder plate 47 is abutted from below against a lower end portion 133*b* of the energy absorbing member 132 (peripheral side wall section 133) but also abutted from below against the lower surface 106*b* of the outer ring 106.

In this embodiment too, the energy absorbing member 132 maintains its shape, against deformation, during the normal condition, so that the holder body 41 is held positioned in the vertical direction by the bearing 103, the energy absorbing member 132 and the opening peripheral edge portion 49.

Further, by being attached to the lower surface 41*a* of the holder body 41 via the holder plate 47, the grass cutting blade 31 is held positioned vertically and centered accurately relative to the output shaft 16. Thus, in assembling the grass cutting blade 31, the operation for centering the grass cutting blade 31 can be performed with ease without taking much time and labor.

Further, during the normal grass cutting operation by the cutting blade 31, the energy absorbing member 132 maintains its shape against deformation, and the energy absorbing member 132 rotates together with the blade holder 28 and the output shaft 16, so that the grass cutting blade 31 can cut grass in an appropriate manner.

If a load exceeding the predetermined value has acted on the energy absorbing member 132, the energy absorbing member 132 deforms, so that the load can be absorbed by the frictional curved surface 38 being slid relative to the hub's curved surface 36 in the direction of arrow A and in the direction of arrow B.

Particularly, because the upper flange 136 is disposed between the holder's protruding section 44 and the upper surface 106a of the outer ring 106 so that the holder's protruding section 44 is spaced upward from the upper surface 106a of the outer ring 106, the frictional curved surface 38 can be suitably slid relative to the hub's curved surface 36 in the direction of arrow B in FIG. 14.

Further, by being disposed in the annular space 57, the energy absorbing member 132 is positioned around the entire periphery of the lower portion 16a of the output shaft 16. Thus, when an impact load has been input from a certain position along the periphery of the lower portion 16a of the output shaft 16, the energy absorbing member 132 can be deformed suitably by the input impact load.

Thus, the sixth embodiment of the blade mounting structure 130 can suitably absorb the impact load input from the certain position along the periphery of the lower portion 16a of the output shaft 16, by moving the friction member 27 relative to the drive hub 26 in the vertical direction (direction of arrow B in FIG. 16). In this way, the sixth embodiment of the blade mounting structure 130 constructed in the aforementioned manner can achieve the same advantageous benefits as the fourth embodiment of the blade mounting structure 100.

Also note that, whereas the sixth embodiment of the invention has been described above in relation to the case where each of the upward bent potions 135a of the upper plate 135 is formed to slant downward from the outer peripheral edge portion 135b to the inner peripheral edge portion 135c, the present invention is not so limited, and each of the upward bent potions 135a of the upper plate 135 may be formed to extend horizontally from the outer peripheral edge portion 135b to the inner peripheral edge portion 135c. Even with the upward bent potions 135a extending horizontally like this, the same advantageous benefits as the above-described sixth embodiment can be achieved.

It should be appreciated that the blade mounting structure of the lawn mower of the present invention is not limited to the above-described embodiments and may be modified variously. For example, whereas the first to sixth embodiments have been described above as applied to the walk-behind lawn mower 10, they may be applied to other types of lawn mowers, such as a riding type lawn mower which a human operator rides on.

Further, whereas the first to sixth embodiments have been described above in relation to the case where the engine 15 is employed as the power source, the present invention is not so limited, and any other type of power source, such as an electrically-driven device, may be employed as the power source.

Furthermore, the shapes and constructions of the walk-behind lawn mower, engine, output shaft, blade mounting structure, drive hub, friction member, blade holder, grass cutting blade, energy absorbing member, hub's curved surface, frictional curved surface, peripheral members, etc. are not limited to those shown and described above and may be modified as necessary.

The basic principles of the present invention are well suited for application to lawn mowers equipped with a blade mounting structure where a blade holder is mounted on an output shaft of a power source and a grass cutting blade is attached to the blade holder.

What is claimed is:

1. A blade mounting structure of a lawn mower, which comprises:
    a drive hub mounted on an output shaft of a power source and protruding radially outward beyond an outer periphery of the output shaft;
    a friction member disposed around the drive hub and configured to transmit driving force from the drive hub to a blade holder when the friction member is in abutting engagement with the drive hub, the drive hub and the friction member having respective curved surfaces slidable on each other when the drive hub and the friction member are in abutting engagement with each other;
    a grass cutting blade attached to the blade holder; and
    an energy absorbing member disposed in a space defined by the blade holder, the drive hub, and the output shaft, the energy absorbing member being constructed to maintain its shape during normal grass cutting condition but deform when a load exceeding a predetermined value acts on the energy absorbing member,
    wherein
    the drive hub has a hub protruding section protruding downward from a bottom surface of the drive hub,
    the blade holder comprises a holder body connected to the friction member, and a holder plate disposed on a lower surface of the holder body,
    the holder body has: a connection section connecting to the friction member; a fitting section provided coaxially with the output shaft; and a holder protruding section protruding inward from an upper end of the fitting section,
    the holder plate has an opening portion formed coaxially with the fitting section, an opening peripheral edge portion forming a peripheral edge of the opening portion,
    the space is formed in an annular shape between the opening peripheral edge portion of the holder plate and the hub protruding section and between a lower portion of the output shaft and the fitting section of the holder body, and
    the energy absorbing member has an annular shape and is disposed in the space.

2. The blade mounting structure according to claim 1, wherein the energy absorbing member is formed in an annular shape with an inner peripheral surface, an outer peripheral surface, an upper surface and a lower surface, and has a substantially rectangular sectional shape.

3. The blade mounting structure according to claim 1, wherein the energy absorbing member has a substantially bellows-shaped sectional shape defined with an upper portion, a lower portion and a slanting portion.

4. The blade mounting structure according to claim 1, wherein the energy absorbing member has a peripheral side wall section of an annular shape, and an annular upper plate provided on an upper end portion of the peripheral side wall section.

5. The blade mounting structure according to claim 1, wherein the energy absorbing member has a substantially bellows-shaped sectional shape defined with a slanting upper section, a slanting lower section and a plurality of connecting sections formed by an intermediate portion, located between the slanting upper section and the slanting lower section, being bent a plurality of times.

\* \* \* \* \*